US010628131B2

(12) United States Patent
Mizota

(10) Patent No.: US 10,628,131 B2
(45) Date of Patent: Apr. 21, 2020

(54) DEVICE AND METHOD OF GENERATING PROGRAMS FOR AN INFORMATION CODE READING DEVICE AND HOST COMPUTER

(71) Applicant: Keyence Corporation, Osaka (JP)

(72) Inventor: Tokihiko Mizota, Osaka (JP)

(73) Assignee: Keyence Corporation, Osaka (JP)

( * ) Notice: Subject to any disclaimer, the term of this patent is extended or adjusted under 35 U.S.C. 154(b) by 349 days.

(21) Appl. No.: 15/442,720

(22) Filed: Feb. 27, 2017

(65) Prior Publication Data

US 2017/0269910 A1 Sep. 21, 2017

(30) Foreign Application Priority Data

Mar. 15, 2016 (JP) ................................ 2016-050788

(51) Int. Cl.
*G06F 8/34* (2018.01)
*G06K 17/00* (2006.01)
*G06F 16/20* (2019.01)

(52) U.S. Cl.
CPC ........... *G06F 8/34* (2013.01); *G06K 17/0022* (2013.01); *G06F 16/20* (2019.01)

(58) Field of Classification Search
CPC ..... G06F 8/20; G06F 8/30; G06F 8/33; G06F 8/34; G06F 8/38; G06F 16/144; G06F 16/156; G06F 16/242; G06F 16/2423; G06F 16/2428; G06F 16/33; G06F 16/332; G06F 16/3323; G06F 16/3328; G06F 16/338;

(Continued)

(56) References Cited

U.S. PATENT DOCUMENTS

| | | | | |
|---|---|---|---|---|
| 7,185,824 | B2 * | 3/2007 | Hepworth | G06K 17/00 235/375 |
| 8,533,583 | B2 * | 9/2013 | Miyahara | G06Q 10/087 715/220 |
| 9,430,575 | B2 * | 8/2016 | Addy | G06F 16/9554 |

FOREIGN PATENT DOCUMENTS

| | | |
|---|---|---|
| JP | 2000-155714 A | 6/2000 |
| JP | 2011-118702 A | 6/2011 |
| JP | 2013-088952 | 5/2013 |

OTHER PUBLICATIONS

Office Action issued in corresponding Japanese Patent Application No. 2016-050788 dated May 22, 2019 with English translation (8 pages).

* cited by examiner

*Primary Examiner* — Todd Aguilera
(74) *Attorney, Agent, or Firm* — Kilyk & Bowersox, P.L.L.C.

(57) ABSTRACT

An object of the present invention is to provide a program development support device capable of easily developing a program for using a handy terminal despite the fact that a user has no knowledge of programming, a program development support method, and a computer program executable in the program development support device. A communication route of data transmission reception between an information reading device and a host computer which are capable of performing a data communication to each other is stored. A selection of master data is received. A selection of the first field as a retrieval processing object from the plurality of fields in the master data is received. A selection of the second field, in which retrieval result data to be displayed is stored, from a plurality of fields corresponding with the records which correspond with a comparison condition based on the retrieval information is received.

20 Claims, 26 Drawing Sheets

(58) Field of Classification Search
CPC ..... G06F 16/20; G06F 16/9954; G06K 17/00; G06K 17/0022
See application file for complete search history.

MASTER DATA EDITING FOR TERMINAL — 81

| ITEM NUMBER | 1ST COLUMN | 2ND COLUMN |
|---|---|---|
| 1 ▲ | AB-1 | PRODUCT 1 |
| 2 | AB-2 | PRODUCT 2 |
| 3 | AA | PRODUCT 3 |
| 4 | RECT | PRODUCT 4 |
| 5 | NN | PRODUCT 5 |
| 6 | VB | PRODUCT 6 |
| 7 | CS | PRODUCT 7 |
| 8 | C-44 | PRODUCT 8 |
| 9 | DN | PRODUCT 9 |
| 10 | AT | PRODUCT 10 |
| 11 | AB-1 | PRODUCT 1 |

82: NUMBER OF COLUMNS [2], ROW DELETE, ENTIRE DELETE, ◀ ▶

84: CSV FETCHING

STORAGE DESTINATION OF MASTER FILE
⦿ DRIVE 1    ○ DRIVE 2    ○ SD CARD — 83

MASTER FILE NAME: DepositoryItemMaster

CLOSE

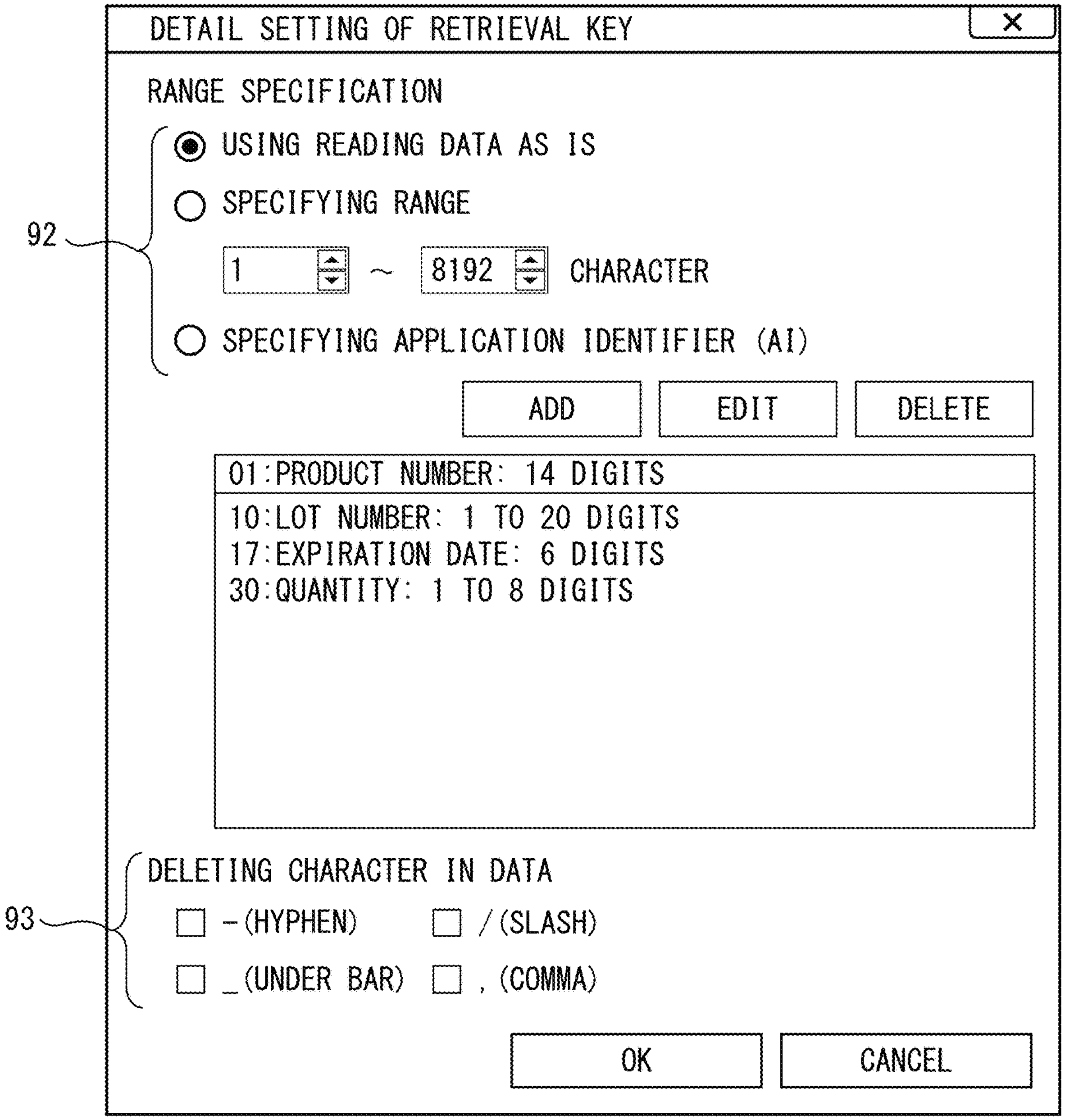

FIG. 9

```
┌─────────────────────────────────────────────────┐
│ DETAIL SETTING OF RETRIEVAL KEY            [ X ]│
│                                                 │
│  RANGE SPECIFICATION                            │
│     ⦿ USING READING DATA AS IS                  │
│     ○ SPECIFYING RANGE                          │
│92      [ 1  ⇅] ~ [8192 ⇅] CHARACTER            │
│     ○ SPECIFYING APPLICATION IDENTIFIER (AI)    │
│              [  ADD  ] [ EDIT ] [ DELETE ]      │
│              ┌─────────────────────────────┐    │
│              │ 01:PRODUCT NUMBER: 14 DIGITS│    │
│              │ 10:LOT NUMBER: 1 TO 20 DIGITS│   │
│              │ 17:EXPIRATION DATE: 6 DIGITS │   │
│              │ 30:QUANTITY: 1 TO 8 DIGITS   │   │
│              │                              │   │
│              └─────────────────────────────┘    │
│                                                 │
│  DELETING CHARACTER IN DATA                     │
│93   ☐ -(HYPHEN)    ☐ /(SLASH)                  │
│     ☐ _(UNDER BAR) ☐ ,(COMMA)                   │
│                                                 │
│                        [   OK   ] [ CANCEL ]    │
└─────────────────────────────────────────────────┘
```

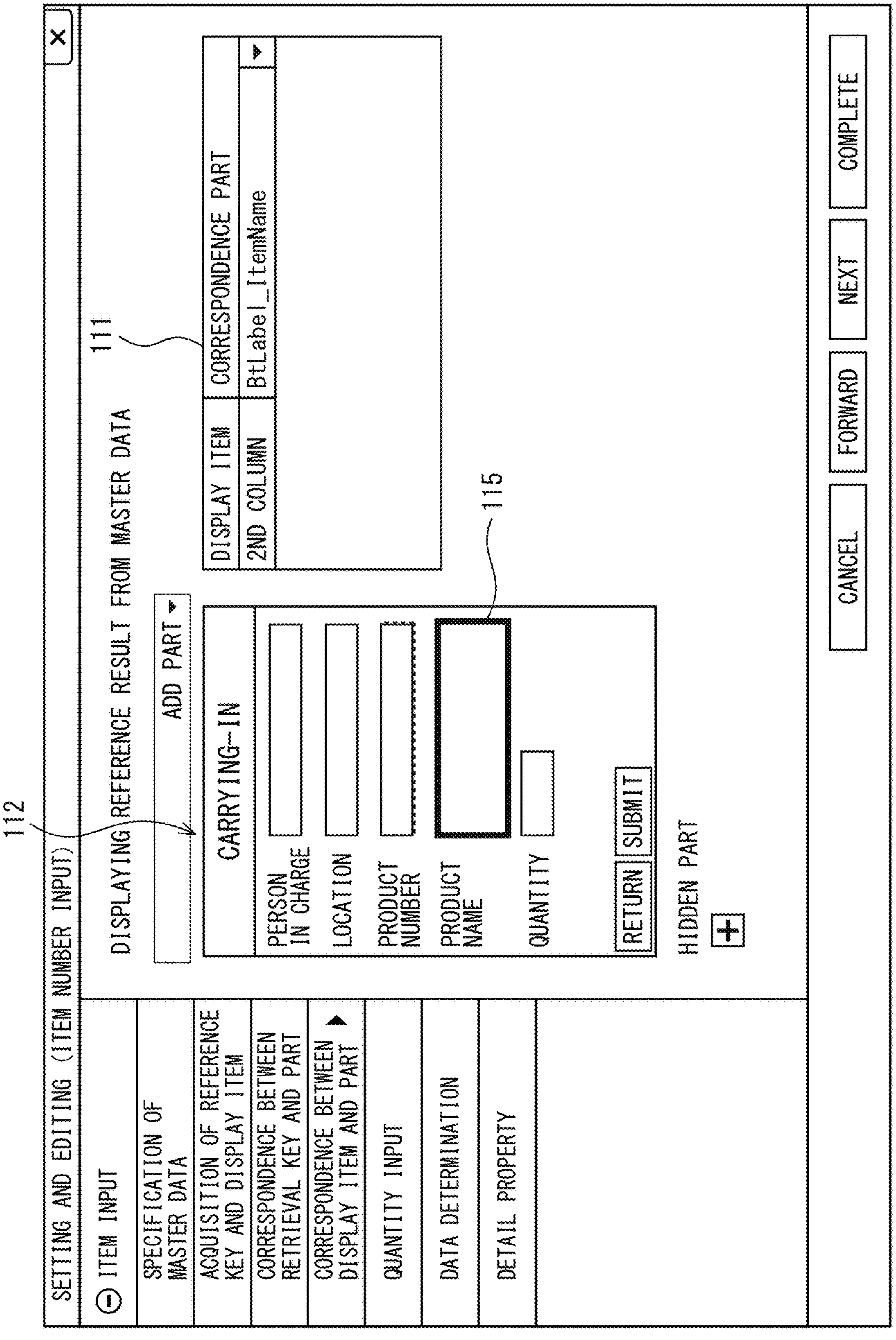

FIG. 12

| SETTING AND EDITING (ITEM NUMBER INPUT) | |
|---|---|
| ⊖ ITEM INPUT | |
| SPECIFICATION OF MASTER DATA | |
| ACQUISITION OF REFERENCE KEY AND DISPLAY ITEM | |
| CORRESPONDENCE BETWEEN RETRIEVAL KEY AND PART ▲ | |
| CORRESPONDENCE BETWEEN DISPLAY ITEM AND PART ▲ | |
| QUANTITY INPUT | |
| DATA DETERMINATION | |
| DETAIL PROPERTY | |

111 —

| DISPLAY ITEM | CORRESPONDENCE PART |
|---|---|
| 2ND COLUMN | BtLabel_ItemName |

112 — DISPLAYING REFERENCE RESULT FROM MASTER DATA

ADD PART ▼

CARRYING-IN

PERSON IN CHARGE
LOCATION
PRODUCT NUMBER
PRODUCT NAME ← 115
QUANTITY

RETURN  SUBMIT

HIDDEN PART  ＋

CANCEL   FORWARD   NEXT   COMPLETE

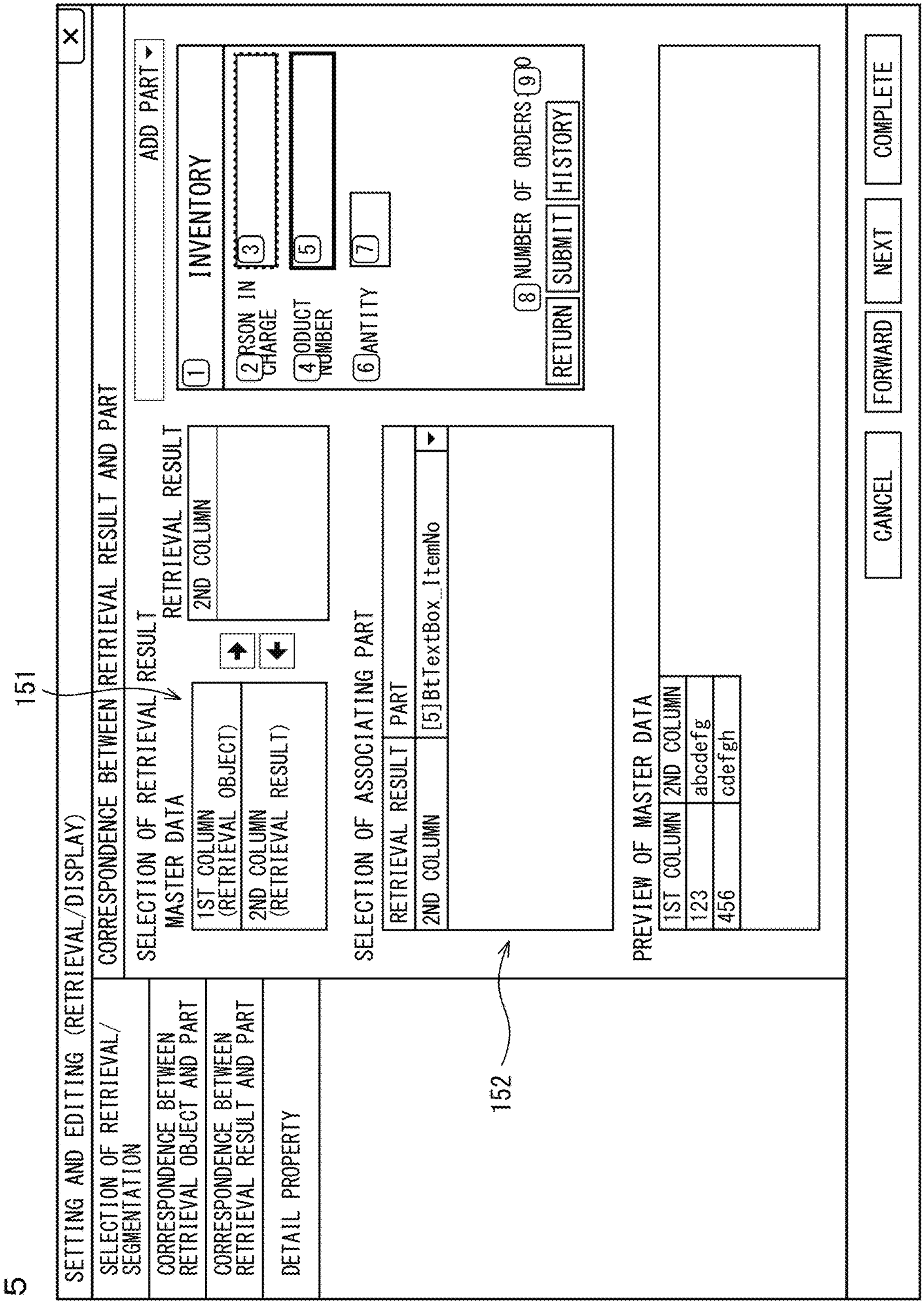

FIG. 15

| SETTING AND EDITING (RETRIEVAL/DISPLAY) | CORRESPONDENCE BETWEEN RETRIEVAL RESULT AND PART |
|---|---|
| SELECTION OF RETRIEVAL/ SEGMENTATION | |
| CORRESPONDENCE BETWEEN RETRIEVAL OBJECT AND PART | SELECTION OF MASTER DATA |
| CORRESPONDENCE BETWEEN RETRIEVAL RESULT AND PART | |
| DETAIL PROPERTY | |

151 — CORRESPONDENCE BETWEEN RETRIEVAL RESULT AND PART

SELECTION OF MASTER DATA
- 1ST COLUMN (RETRIEVAL OBJECT)
- 2ND COLUMN (RETRIEVAL RESULT)

RETRIEVAL RESULT
2ND COLUMN

SELECTION OF ASSOCIATING PART

| RETRIEVAL RESULT | PART |
|---|---|
| 2ND COLUMN | [5]BtTextBox_ItemNo |

152

PREVIEW OF MASTER DATA

| 1ST COLUMN | 2ND COLUMN |
|---|---|
| 123 | abcdefg |
| 456 | cdefgh |

ADD PART ▼

INVENTORY
- [1]
- [2] PERSON IN CHARGE [3]
- [4] PRODUCT NUMBER [5]
- [6] QUANTITY [7]
- [8] NUMBER OF ORDERS [9] [0]
- RETURN | SUBMIT | HISTORY

CANCEL  FORWARD  NEXT  COMPLETE

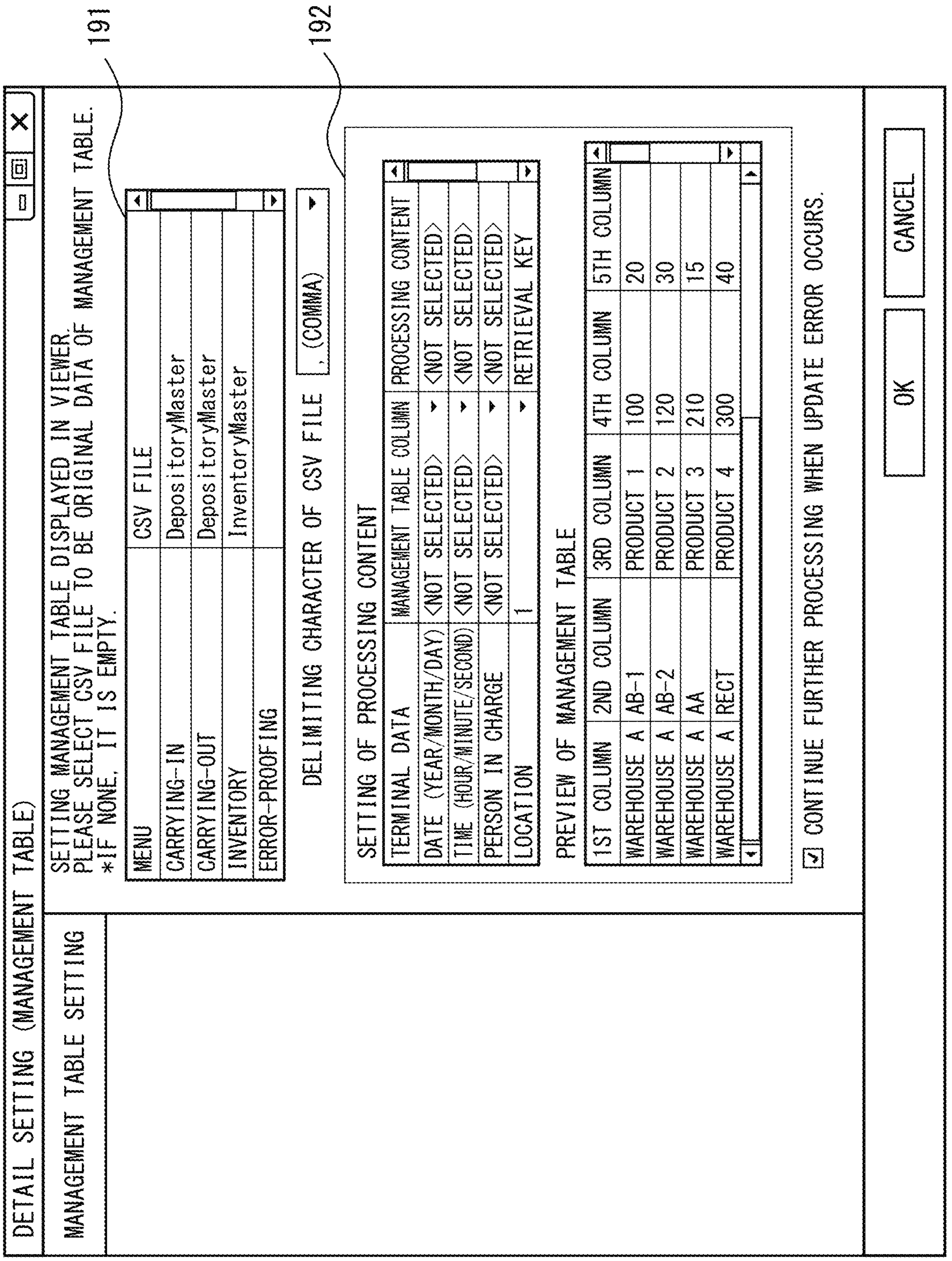

FIG. 19

DETAIL SETTING (MANAGEMENT TABLE)

MANAGEMENT TABLE SETTING

SETTING MANAGEMENT TABLE DISPLAYED IN VIEWER.
PLEASE SELECT CSV FILE TO BE ORIGINAL DATA OF MANAGEMENT TABLE.
*IF NONE, IT IS EMPTY.

— 191

| MENU | CSV FILE |
|---|---|
| CARRYING-IN | DepositoryMaster |
| CARRYING-OUT | DepositoryMaster |
| INVENTORY | InventoryMaster |
| ERROR-PROOFING | |

DELIMITING CHARACTER OF CSV FILE  , (COMMA) ▼

— 192

SETTING OF PROCESSING CONTENT

| TERMINAL DATA | MANAGEMENT TABLE COLUMN | PROCESSING CONTENT |
|---|---|---|
| DATE (YEAR/MONTH/DAY) | <NOT SELECTED> ▼ | <NOT SELECTED> ▼ |
| TIME (HOUR/MINUTE/SECOND) | <NOT SELECTED> ▼ | <NOT SELECTED> ▼ |
| PERSON IN CHARGE | <NOT SELECTED> ▼ | <NOT SELECTED> ▼ |
| LOCATION | 1 | RETRIEVAL KEY |

PREVIEW OF MANAGEMENT TABLE

| 1ST COLUMN | 2ND COLUMN | 3RD COLUMN | 4TH COLUMN | 5TH COLUMN |
|---|---|---|---|---|
| WAREHOUSE A | AB-1 | PRODUCT 1 | 100 | 20 |
| WAREHOUSE A | AB-2 | PRODUCT 2 | 120 | 30 |
| WAREHOUSE A | AA | PRODUCT 3 | 210 | 15 |
| WAREHOUSE A | RECT | PRODUCT 4 | 300 | 40 |

☑ CONTINUE FURTHER PROCESSING WHEN UPDATE ERROR OCCURS.

[ OK ]   [ CANCEL ]

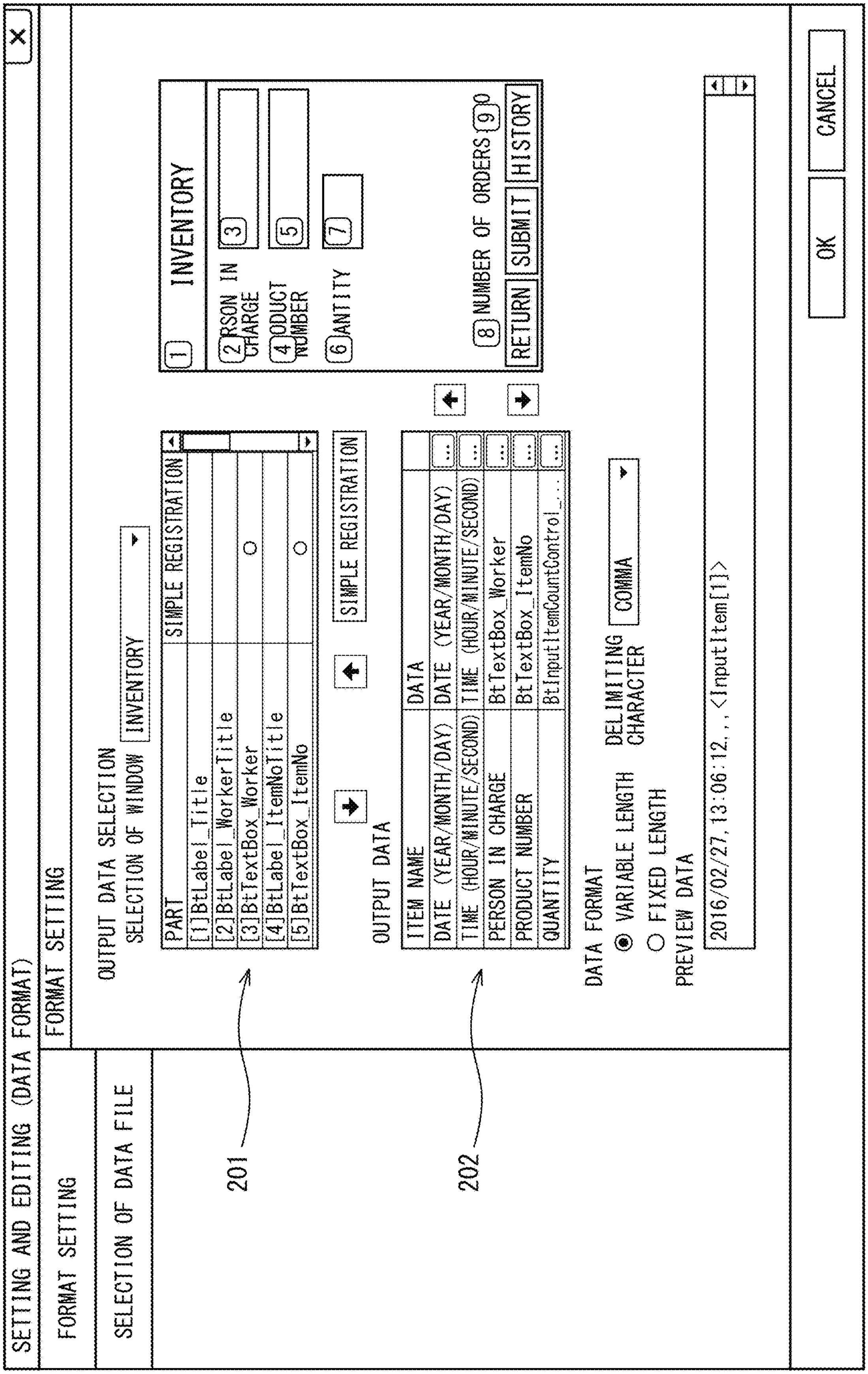

FIG. 20

| SETTING AND EDITING (DATA FORMAT) | | |
|---|---|---|
| FORMAT SETTING | FORMAT SETTING | |
| | SELECTION OF DATA FILE | |

OUTPUT DATA SELECTION
SELECTION OF WINDOW [INVENTORY ▼]

| PART | SIMPLE REGISTRATION |
|---|---|
| [1]BtLabel_Title | |
| [2]BtLabel_WorkerTitle | |
| [3]BtTextBox_Worker | ○ |
| [4]BtLabel_ItemNoTitle | |
| [5]BtTextBox_ItemNo | ○ |

← 201

→  ←  [SIMPLE REGISTRATION ▼]

OUTPUT DATA

| ITEM NAME | DATA |
|---|---|
| DATE (YEAR/MONTH/DAY) | DATE (YEAR/MONTH/DAY) |
| TIME (HOUR/MINUTE/SECOND) | TIME (HOUR/MINUTE/SECOND) |
| PERSON IN CHARGE | BtTextBox_Worker |
| PRODUCT NUMBER | BtTextBox_ItemNo |
| QUANTITY | BtInputItemCountControl... |

← 202

DATA FORMAT    DELIMITING CHARACTER [COMMA ▼]
● VARIABLE LENGTH
○ FIXED LENGTH
PREVIEW DATA
2016/02/27,13:06:12,,,<InputItem[1]>

[INVENTORY window with fields: ①, ②PERSON IN CHARGE [3], ④PRODUCT NUMBER [5], ⑥QUANTITY [7], ⑧RETURN SUBMIT HISTORY, ⑨NUMBER OF ORDERS [0]]

[OK]  [CANCEL]

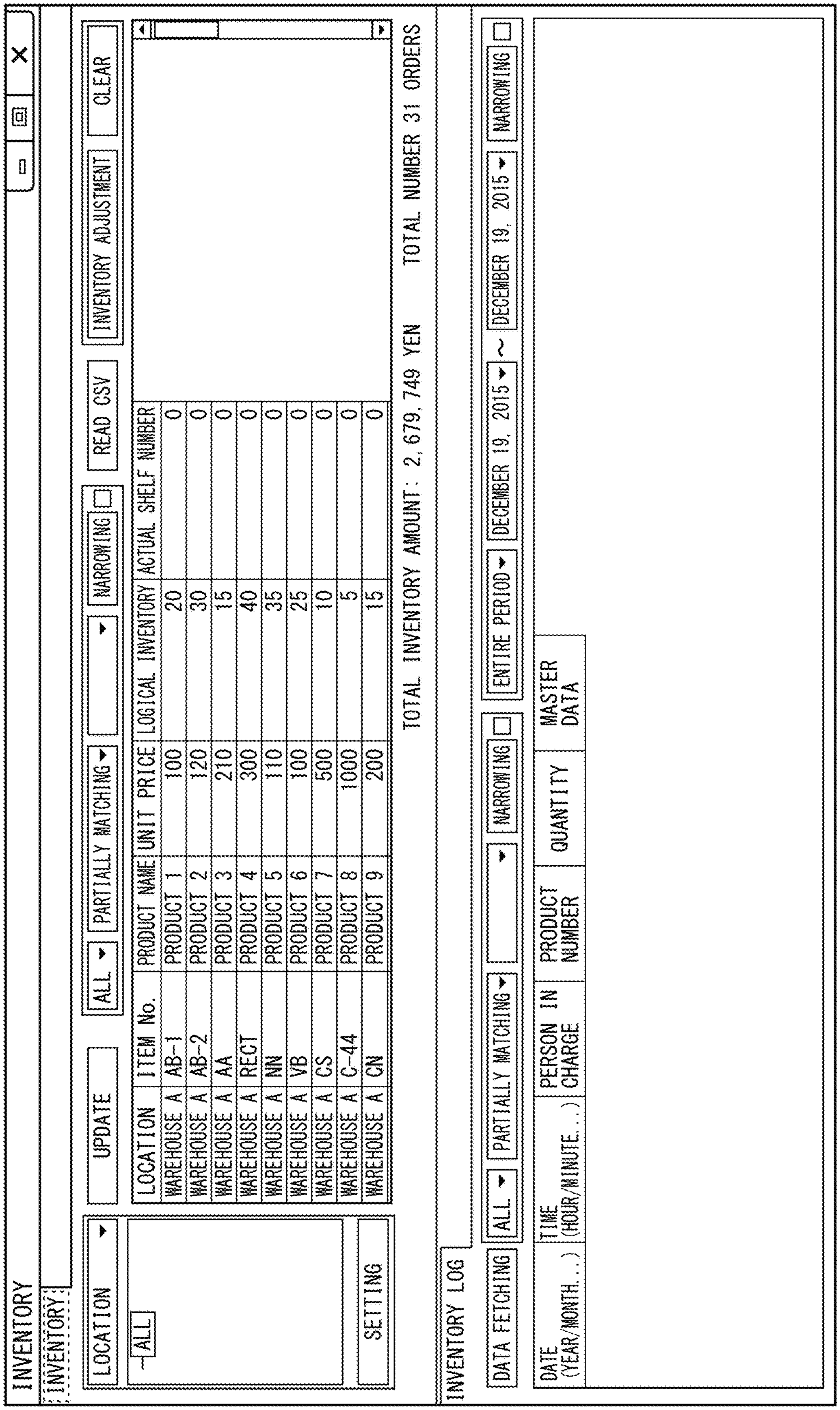

FIG. 21

| LOCATION | ITEM No. | PRODUCT NAME | UNIT PRICE | LOGICAL INVENTORY | ACTUAL SHELF NUMBER |
|---|---|---|---|---|---|
| WAREHOUSE A | AB-1 | PRODUCT 1 | 100 | 20 | 0 |
| WAREHOUSE A | AB-2 | PRODUCT 2 | 120 | 30 | 0 |
| WAREHOUSE A | AA | PRODUCT 3 | 210 | 15 | 0 |
| WAREHOUSE A | RECT | PRODUCT 4 | 300 | 40 | 0 |
| WAREHOUSE A | NN | PRODUCT 5 | 110 | 35 | 0 |
| WAREHOUSE A | VB | PRODUCT 6 | 100 | 25 | 0 |
| WAREHOUSE A | CS | PRODUCT 7 | 500 | 10 | 0 |
| WAREHOUSE A | C-44 | PRODUCT 8 | 1000 | 5 | 0 |
| WAREHOUSE A | CN | PRODUCT 9 | 200 | 15 | 0 |

TOTAL INVENTORY AMOUNT: 2,679,749 YEN    TOTAL NUMBER 31 ORDERS

INVENTORY LOG

| DATE (YEAR/MONTH...) | TIME (HOUR/MINUTE...) | PERSON IN CHARGE | PRODUCT NUMBER | QUANTITY | MASTER DATA |
|---|---|---|---|---|---|

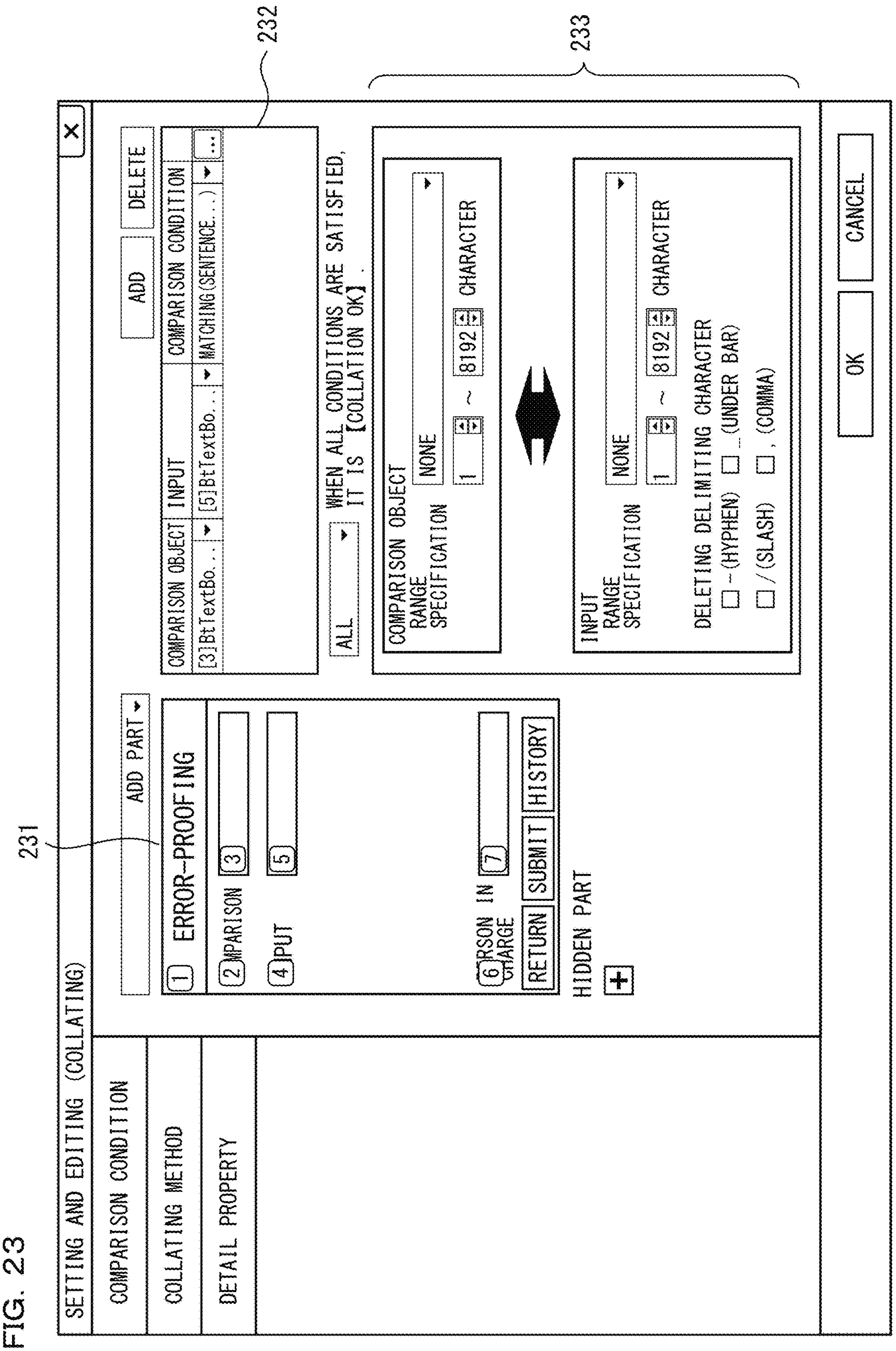

FIG. 23

| SETTING AND EDITING (COLLATING) | | |
|---|---|---|
| COMPARISON CONDITION | | |
| COLLATING METHOD | | |
| DETAIL PROPERTY | | |

231 — ERROR-PROOFING [ADD PART ▼]
① 
② MPARISON  ③
④ PUT  ⑤
⑥ RSON IN CHARGE  ⑦
[RETURN] [SUBMIT] [HISTORY]
HIDDEN PART
[+]

232 — [ADD] [DELETE]

| COMPARISON OBJECT | INPUT | COMPARISON CONDITION |
|---|---|---|
| [3]BtTextBo... ▼ | [5]BtTextBo... ▼ | MATCHING(SENTENCE...) ▼ [...] |

[ALL ▼] → WHEN ALL CONDITIONS ARE SATISFIED, IT IS [COLLATION OK].

233 —
COMPARISON OBJECT RANGE SPECIFICATION: [NONE ▼]  1 ~ 8192 CHARACTER
⬌
INPUT RANGE SPECIFICATION: [NONE ▼]  1 ~ 8192 CHARACTER
DELETING DELIMITING CHARACTER
☐ ~ (HYPHEN)  ☐ _ (UNDER BAR)
☐ / (SLASH)   ☐ , (COMMA)

[OK] [CANCEL]

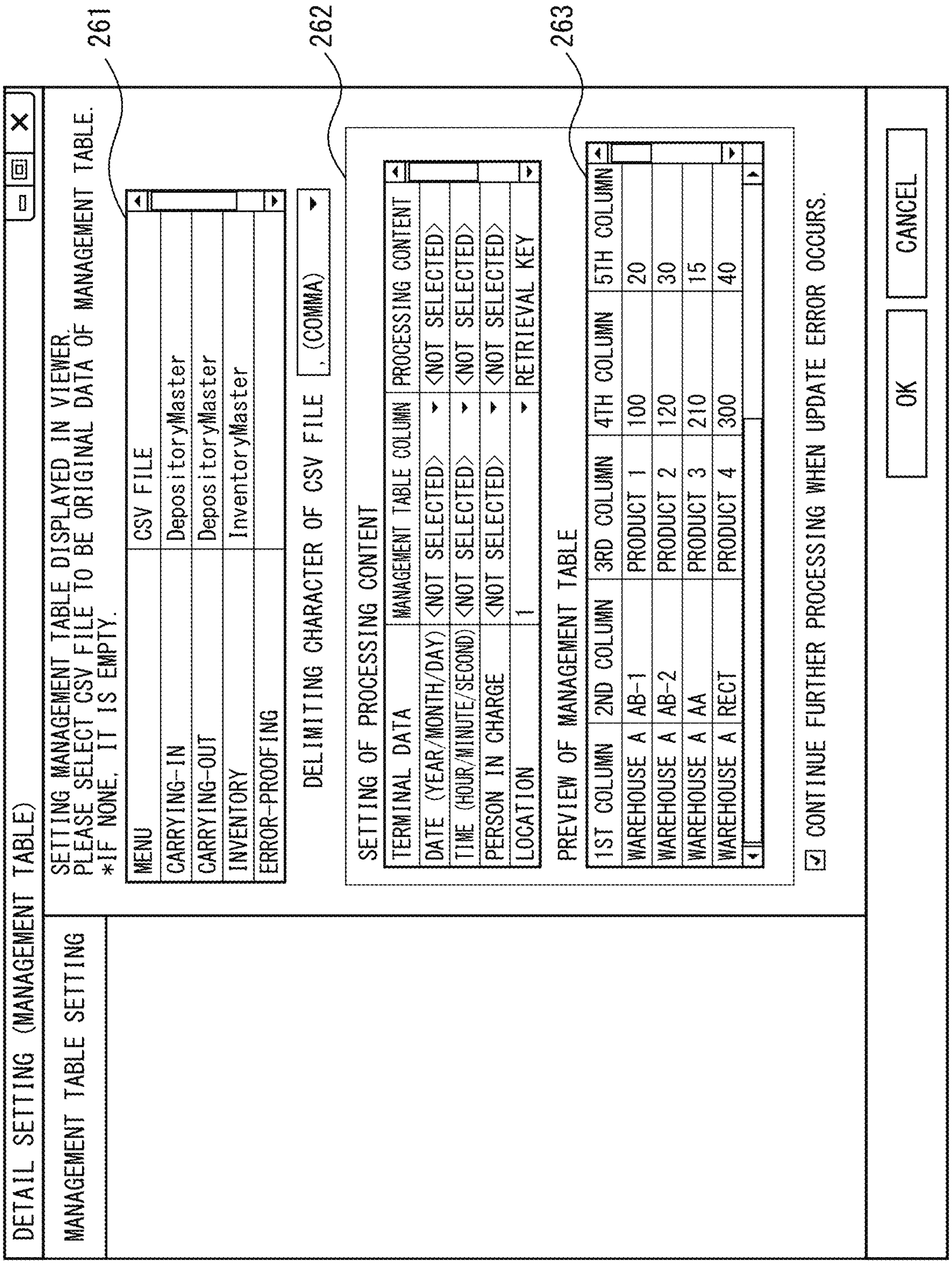

FIG. 26

DETAIL SETTING (MANAGEMENT TABLE)

MANAGEMENT TABLE SETTING

SETTING MANAGEMENT TABLE DISPLAYED IN VIEWER.
PLEASE SELECT CSV FILE TO BE ORIGINAL DATA OF MANAGEMENT TABLE.
*IF NONE, IT IS EMPTY.

261

| MENU | CSV FILE |
|---|---|
| CARRYING-IN | DepositoryMaster |
| CARRYING-OUT | DepositoryMaster |
| INVENTORY | InventoryMaster |
| ERROR-PROOFING | |

262

DELIMITING CHARACTER OF CSV FILE  , (COMMA)

263

SETTING OF PROCESSING CONTENT

| TERMINAL DATA | MANAGEMENT TABLE COLUMN | PROCESSING CONTENT |
|---|---|---|
| DATE (YEAR/MONTH/DAY) | <NOT SELECTED> | <NOT SELECTED> |
| TIME (HOUR/MINUTE/SECOND) | <NOT SELECTED> | <NOT SELECTED> |
| PERSON IN CHARGE | <NOT SELECTED> | <NOT SELECTED> |
| LOCATION | 1 | RETRIEVAL KEY |

PREVIEW OF MANAGEMENT TABLE

| 1ST COLUMN | 2ND COLUMN | 3RD COLUMN | 4TH COLUMN | 5TH COLUMN |
|---|---|---|---|---|
| WAREHOUSE A | AB-1 | PRODUCT 1 | 100 | 20 |
| WAREHOUSE A | AB-2 | PRODUCT 2 | 120 | 30 |
| WAREHOUSE A | AA | PRODUCT 3 | 210 | 15 |
| WAREHOUSE A | RECT | PRODUCT 4 | 300 | 40 |

☑ CONTINUE FURTHER PROCESSING WHEN UPDATE ERROR OCCURS.

OK    CANCEL

DEVICE AND METHOD OF GENERATING PROGRAMS FOR AN INFORMATION CODE READING DEVICE AND HOST COMPUTER

CROSS-REFERENCE TO RELATED APPLICATIONS

The present application claims foreign priority based on Japanese Patent Application No. 2016-050788, filed Mar. 15, 2016, the contents of which is incorporated herein by reference.

TECHNOLOGICAL FILED

The present invention relates to a program development support device capable of easily developing a program for using a handy terminal despite the fact that a user has no knowledge of programming, a program development support method, and a computer program executable in the program development support device.

BACKGROUND ART

A portable handy terminal is well known as an optical information reader which reads information codes such as bar codes, etc. marked on products or packing boxes, etc. in a factory, a warehouse, etc. (see Patent Document 1: Japanese Patent Application Publication No. 2013-088952).

The handy terminal reads the information codes by emitting laser light and scanning the bar codes, etc. by the laser light. The reading data in which the read information codes are decoded is transmitted to a host computer (server), and by collating database, etc. in the host computer, the corresponding data is returned to the handy terminal.

However, right after the handy terminal is purchased, an application program in accordance with a user's purpose of use is not available in the handy terminal and the host computer. Therefore, it has been required to develop both of an application program for the handy terminal and an application program for the host computer by the user in accordance with the user's purpose of use.

SUMMARY OF THE INVENTION

However, there are many differences in the specifications of the programming languages between the application program for the handy terminal, which works in the handy terminal, and the application program for the host computer, which works in the host computer. Accordingly, there has been a problem in which it has been difficult to develop both the application programs by an individual user unless the user has knowledge of the programming languages.

Further, the application for the handy terminal has relatively a simple structure, and conventionally, a software for supporting design or creation has been provided. On the other hand, it has been required to develop and customize the application and the database processing in the host computer side in accordance with the user's purpose of use because the user's purpose of use has been different for each user and there have been many systems, etc. which have been cooperated with the application and the database processing. Further, from the technical perspective, it is difficult for the development because it is required to have high skill in the database creation processing language, etc.

The present invention was made in consideration of appropriate situation. An object of the present invention is to provide a program development support device capable of easily developing a program for using a handy terminal despite the fact that a user has no knowledge of programming, a program development support method, and a computer program executable in the program development support device.

A program development support device according to the $1^{st}$ invention to achieve the aforementioned object performs with an information reading device having a code reading unit, which executes a reading of an information code, and a display unit which displays various data; and a host computer being connected to be capable of performing a data communication with the information reading device to each other and storing master data of which data streams are stored in a plurality of fields of a plurality of records. The program development support device generates a first program sending reading data, which is acquired based on the information code read by the information reading device, to the host computer, and a second program, which performs a retrieval in the master data based on the received reading data as retrieval information in the host computer and sends retrieval result data to the information reading device. The program development support device includes a communication setting storage unit storing a communication route of data transmission reception between the information reading device and the host computer which are capable of performing the data communication to each other; a master data specifying unit receiving a specification of the master data; a first setting reception unit receiving a selection of a first field as a retrieval processing object from the plurality of fields in the master data which is specified, and receiving a selection of a second field, in which retrieval result data to be displayed is stored, from the plurality of fields corresponding with the records which correspond with a comparison condition based on the retrieval information; a second setting reception unit corresponding the first field with an output element used for inputting or displaying the reading data, and corresponding the second field with an output element used for displaying the retrieval result data; and a builder unit generating the first program and the second program based on the first field and the second field which are selected, and the output elements which are respectively corresponded with the first field and the second field.

Further, in the program development support device according to the $2^{nd}$ invention, it is preferable that in the $1^{st}$ invention, the builder unit generates the second program based on the first field and the second field which are selected in the first setting reception unit and the stored communication route.

Further, in the program development support device according to the $3^{rd}$ invention, it is preferable that in the $1^{st}$ invention or the $2^{nd}$ invention, the program development support device includes a third setting reception unit receiving a selection of a third field, which inputs or displays reading data based on the information code read by the information reading device, and collating the third field and the first field or the second field.

Further, in the program development support device according to the 4th invention, it is preferable that in any one of the $1^{st}$ invention to the $3^{rd}$ invention, a display mode in a display of a field which performs a selection is different from other fields.

Further, in the program development support device according to the $5^{th}$ invention, it is preferable that in any one of the $1^{st}$ invention to the $4^{th}$ invention, a correspondence relationship between the first field displayed in the information reading device and the second field of the master data of the host computer is displayed.

Further, in the program development support device according to the $6^{th}$ invention, it is preferable that in any one of the $1^{st}$ invention to the $5^{th}$ invention, template data in which a correspondence relationship between the first field displayed in the information reading device and the second field of the master data of the host computer is preliminary set is stored, and the first program and the second program are generated by reading the template data.

Next, a program development support device according to the $7^{th}$ invention to achieve the aforementioned object performs with an information reading device having a code reading unit, which executes a reading of an information code, and a display unit which displays various data; and a host computer being connected to be capable of performing a data communication with the information reading device to each other and storing master data of which data streams are stored in a plurality of fields of a plurality of records. The program development support device generates a first program sending reading data, which is acquired based on the information code read by the information reading device, to the host computer, and a second program, which performs a retrieval in the master data based on the received reading data as retrieval information in the host computer and sends retrieval result data to the information reading device. The program development support device includes a communication setting storage unit storing a communication route of data transmission reception between the information reading device and the host computer which are capable of performing the data communication to each other; a master data specifying unit receiving a specification of the master data; a fourth setting reception unit corresponding an output element, which is used for inputting or displaying the reading data, with each field in the master data which is specified, and corresponding an output element, which is used for displaying the retrieval result data, with each field in the master data which is specified; a fifth setting reception unit receiving a selection of a first field which stores reading data to be displayed from a plurality of fields in the master data which corresponds with an output element, and receiving a selection of a second field which stores retrieval result data to be displayed from a plurality of fields corresponding with a record which corresponds with a comparison condition based the retrieval information; a builder unit generating the first program and the second program based on the first field and the second field which are selected, and the output elements which are respectively corresponded with the first field and the second field.

Next, a program development support method according to the $8^{th}$ invention to achieve the aforementioned object is executed in a program development support device to perform with an information reading device having a code reading unit, which executes a reading of an information code, and a display unit which displays various data; and a host computer being connected to be capable of performing a data communication with the information reading device to each other and storing master data of which data streams are stored in a plurality of fields of a plurality of records. The program development support device generates a first program sending reading data, which is acquired based on the information code read by the information reading device, to the host computer, and a second program, which performs a retrieval in the master data based on the received reading data as retrieval information in the host computer and sends retrieval result data to the information reading device. The program development support method includes a first step storing a communication route of data transmission reception between the information reading device and the host computer which are capable of performing a data communication to each other; a second step receiving a specification of the master data; a third step receiving a selection of a first field as a retrieval processing object from the plurality of fields in the master data which is specified, and receiving a selection of a second field, in which retrieval result data to be displayed is stored, from a plurality of fields corresponding with the records which correspond with a comparison condition based on the retrieval information; a fourth step corresponding the first field with an output element used for inputting or displaying the reading data, and corresponding the second field with an output element used for displaying the retrieval result data; and a fifth step generating the first program and the second program based on the first field and the second field which are selected, and the output elements which are respectively corresponded with the first field and the second field.

Further, in the program development support method according to the 9th invention, it is preferable that in the $8^{th}$ invention, the fifth step generates the second program based on the first field and the second field which are selected and the stored communication route.

Further, in the program development support method according to the $10^{th}$ invention, it is preferable that in the $8^{th}$ invention or the $9^{th}$ invention, the program development support device includes a sixth step receiving a selection of a third field, which inputs or displays reading data based on the information code read by the information reading device, from the plurality of fields, and collating the third field and the first field or the second field.

Further, in the program development support method according to the $11^{th}$ invention, it is preferable that in any one of the $8^{th}$ invention to the $10^{th}$ invention, a display mode in a display of a field which performs a selection is different from other fields.

Further, in the program development support method according to the $12^{th}$ invention, it is preferable that in any one of the $8^{th}$ invention to the $11^{th}$ invention, a correspondence relationship between the first field displayed in the information reading device and the second field of the master data of the host computer is displayed.

Further, in the program development support method according to the $13^{th}$ invention, it is preferable that in any one of the $8^{th}$ invention to the $12^{th}$ invention, template data in which a correspondence relationship between the first field displayed in the information reading device and the second field of the master data of the host computer is preliminary set is stored, and the first program and the second program are generated by reading the template data.

Next, a program development support method according to the $14^{th}$ invention to achieve the aforementioned object is executed in a program development support device to perform with an information reading device having a code reading unit, which executes a reading of an information code, and a display unit which displays various data; and a host computer being connected to be capable of performing a data communication with the information reading device to each other and storing master data of which data streams are stored in a plurality of fields of a plurality of records. The program development support device generates a first program sending reading data, which is acquired based on the information code read by the information reading device, to the host computer, and a second program, which performs a retrieval in the master data based on the received reading data as retrieval information in the host computer and sends retrieval result data to the information reading device. The program development support method includes a first step storing a communication route of data transmission reception between the information reading device and the host computer which are capable of performing a data communication to each other; a second step receiving a specification of the master data; a seventh step corresponding an output element, which is used for inputting or displaying the reading data, with each field in the master data which is specified, and corresponding an output element, which is used for displaying the retrieval result data, with each field in the master data which is specified; an eighth step receiving a selection of a first field which stores reading data to be displayed from a plurality of fields in the master data which corresponds with an output element, and receiving a selection of a second field which stores retrieval result data to be displayed from a plurality of fields corresponding with a record which corresponds with a comparison condition based the retrieval information; a fifth step generating the first program and the second program based on the first field and the second field which are selected, and the output elements which are respectively corresponded with the first field and the second field.

Next, a computer program according to the 15$^{th}$ invention to achieve the aforementioned object is executed in a program development support device to perform with an information reading device having a code reading unit, which executes a reading of an information code, and a display unit which displays various data; and a host computer being connected to be capable of performing a data communication with the information reading device to each other and storing master data of which data streams are stored in a plurality of fields of a plurality of records. The program development support device generates a first program sending reading data, which is acquired based on the information code read by the information reading device, to the host computer, and a second program, which performs a retrieval in the master data based on the received reading data as retrieval information in the host computer and sends retrieval result data to the information reading device. The program development support device includes a communication setting storage unit storing a communication route of data transmission reception between the information reading device and the host computer which are capable of performing the data communication to each other; a master data specifying unit receiving a specification of the master data; a first setting reception unit receiving a selection of a first field as a retrieval processing object from the plurality of fields in the master data which is specified, and receiving a selection of a second field, in which retrieval result data to be displayed is stored, from a plurality of fields corresponding with the records which correspond with a comparison condition based on the retrieval information; a second setting reception unit corresponding the first field with an output element used for inputting or displaying the reading data, and corresponding the second field with an output element used for displaying the retrieval result data; and a builder unit generating the first program and the second program based on the first field and the second field which are selected, and the output elements which are respectively corresponded with the first field and the second field.

Next, a computer program according to the 16$^{th}$ invention to achieve the aforementioned object is executable in a program development support device to perform with an information reading device having a code reading unit, which executes a reading of an information code, and a display unit which displays various data; and a host computer being connected to be capable of performing a data communication with the information reading device to each other and storing master data of which data streams are stored in a plurality of fields of a plurality of records. The program development support device generates a first program sending reading data, which is acquired based on the information code read by the information reading device, to the host computer, and a second program, which performs a retrieval in the master data based on the received reading data as retrieval information in the host computer and sends retrieval result data to the information reading device. The program development support device includes a communication setting storage unit storing a communication route of data transmission reception between the information reading device and the host computer which are capable of performing the data communication to each other; a master data specifying unit receiving a specification of the master data; a fourth setting reception unit corresponding an output element, which is used for inputting or displaying the reading data, with each field in the master data which is specified, and corresponding an output element, which is used for displaying the retrieval result data, with each field in the master data which is specified; a fifth setting reception unit receiving a selection of a first field which stores reading data to be displayed from a plurality of fields in the master data which corresponds with an output element, and receiving a selection of a second field which stores retrieval result data to be displayed from a plurality of fields corresponding with a record which corresponds with a comparison condition based the retrieval information; a builder unit generating the first program and the second program based on the first field and the second field which are selected, and the output elements which are respectively corresponded with the first field and the second field.

In the 1$^{st}$ invention, the 8$^{th}$ invention, and the 15$^{th}$ invention, the communication route between the information reading device and the host computer which are capable of performing a data communication to each other is stored. A specification of the master data is received, and a selection of a first field as a retrieval processing object from the plurality of fields in the master data which is specified is received, and a selection of a second field, in which retrieval result data to be displayed is stored, from a plurality of fields corresponding with the records which correspond with a comparison condition based on the retrieval information is received. The first field is corresponded with an output element used for inputting or displaying the reading data, and the second field is corresponded with an output element used for displaying the retrieval result data. The first program and the second program based on the first field and the second field which are selected, and the output elements which are respectively corresponded with the first field and the second field are generated. With this, while reviewing the preview screen of the master data and the output elements, it is possible to easily set which output element stored in the information reading device is corresponded with the retrieval information inputted by the user, and it is possible to easily set which output element stored in the information reading device is corresponded with the retrieval result data, which is the retrieval result in the master data by the inputted retrieval information. Therefore, it is possible to easily create the programs in the information reading device side and the program in the host computer side.

In the 2$^{nd}$ invention and the 9$^{th}$ invention, since the second program is generated based on the first field, the second field which are selected, and the stored communication route, not only the program (first program) in the information reading device side but also the program (second program) in the host computer side can be easily generated even though the user has no technical knowledge regarding the database of the host computer.

In the $3^{rd}$ invention and the $10^{th}$ invention, since the selection of the third field, which inputs and displays the reading data based on the information code read by the information reading device from the plurality of fields, is received, and the third field and the first field or the second field are collated, by displaying data based on another information code and collating the data with the reading data or the retrieval result data used as the retrieval information, it is possible to confirm whether or not the operation is correctly performed.

In the $4^{th}$ invention and the $11^{th}$ invention, since the display mode in the selected field is different from the display mode in other fields, it is possible to create a program while the user visually confirms which field is setting.

In the $5^{th}$ invention and the $12^{th}$ invention, since the correspondence relationship between the first field displayed in the information reading device and the second field of the master data of the host computer is displayed, it is possible to display a guidance which data is setting for the correspondence relationship, and it is possible to create a program while visually confirming the program.

In the $6^{th}$ invention and the $13^{th}$ invention, since template data in which a correspondence relationship between the first field displayed in the information reading device and the second field of the master data of the host computer is preliminary set is stored, and the first program and the second program are generated by reading the template data, it is possible to reduce the time creating the programs.

In the $7^{th}$ invention, the $14^{th}$ invention, and the $16^{th}$ invention, the communication route of the data transmission reception between the information reading device and the host computer which are capable of performing a data communication to each other. The output element, which is used for inputting or displaying the reading data, is corresponded with each field in the master data which is specified, and the output element, which is used for displaying the retrieval result data, is corresponded with each field in the master data which is specified. The selection of the first field which stores reading data to be displayed from a plurality of fields in the master data which corresponds with an output element is received. The selection of the second field which stores retrieval result data to be displayed from a plurality of fields corresponding with a record which corresponds with a comparison condition based the retrieval information is received. The first program and the second program based on the first field and the second field which are selected, and the output elements which are respectively corresponded with the first field and the second field are generated. With this, while reviewing the preview screen of the master data and the output elements, it is possible to easily set which output element stored in the information reading device is corresponded with the retrieval information inputted by the user, and it is possible to easily set which output element stored in the information reading device is corresponded with the retrieval result data which is the retrieval results of the master data by the inputted retrieval information. Therefore, it is possible to easily create the programs in the information reading device side and the program in the host computer side.

In the present invention, while reviewing the preview screen of the master data and the output elements, it is possible to easily set which output element stored in the information reading device is corresponded with the retrieval information inputted by the user, and it is possible to easily set which output element stored in the information reading device is corresponded with the retrieval result data which is the retrieval results of the master data by the inputted retrieval information. Therefore, it is possible to easily create the programs in the information reading device side and the program in the host computer side.

BRIEF DESCRIPTION OF THE DRAWINGS

FIG. 9 is a diagram showing an example of a retrieval information setting screen of the program development support device according to embodiment 1 of the present invention;

FIG. 12 is a diagram showing another example of the output element setting screen of the program development support device according to embodiment 1 of the present invention;

FIG. 15 is a diagram showing another example of the selection receiving screen of the program development support device according to embodiment 1 of the present invention;

FIG. 19 is diagram showing an example of a setting screen of data, which becomes master data of the program development support device according to embodiment 1 of the present invention, and a database processing of the data;

FIG. 20 is a diagram showing an example of an output data registration/editing screen of the program development support device according to embodiment 1 of the present invention;

FIG. 21 is a diagram showing an example of the second program screen of the program development support device according to embodiment 1 of the present invention;

FIG. 23 is a diagram showing an example of a collation object setting screen of the program development support device according to embodiment 2 of the present invention;

FIG. 26 is a diagram showing an example of the output setting screen of log data of the host computer of the program development support device according to embodiment 3 of the present invention.

EMBODIMENTS FOR CARRYING OUT THE INVENTION

Figure 1:
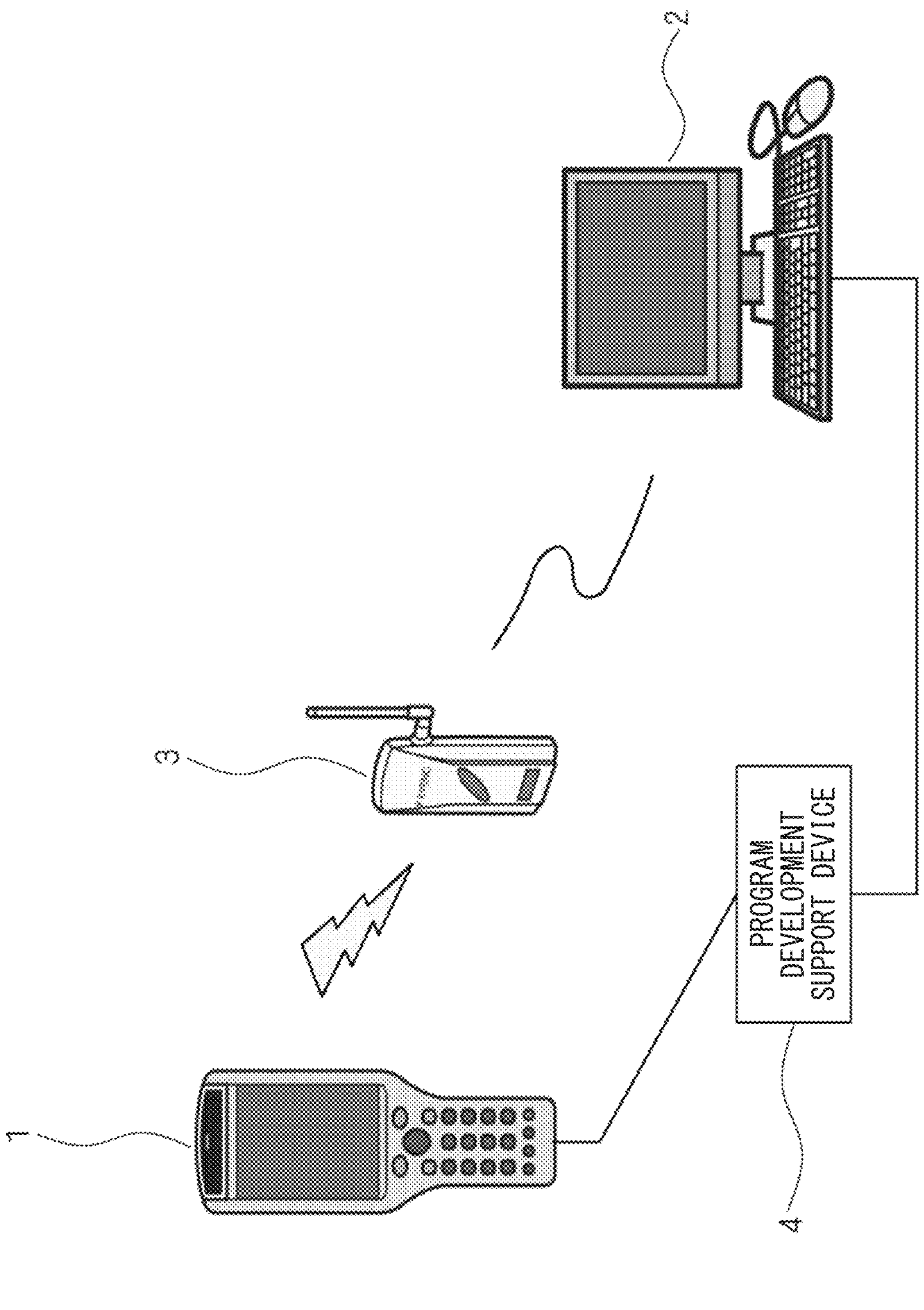
FIG. 1 is a schematic diagram showing a configuration of an information system, which transmits data between an information reading device reading an information code and a host computer, including a program development support device according to embodiment 1 of the present invention.

Hereinafter, the program development support device according to the embodiments of the present invention will be described with reference to the drawings. In the drawings to describe the present embodiments, the same or similar reference numerals are used for the elements having the same or similar components or functions, and their detailed descriptions are omitted. Hereinafter, the program development support device will be described in a case in which an information system transmitting data between an (optical) information reading device, e.g. a handy terminal, reading an information code and a host computer is used as an example.

Embodiment 1

FIG. 1 is a schematic diagram showing a configuration of an information system, which transmits data between an optical information reading device, e.g. a handy terminal, reading an information code and a host computer, including a program development support device according to embodiment 1 of the present invention. The host computer is not limited to a computer such as personal computer (PC), etc. As shown in FIG. 1, in the information system according to present embodiment 1, an information reading device 1, e.g. a handy terminal, which reads an information code such as a bar code, a two-dimensional code, a radio tag, etc., is connected to be capable of performing a data communication with a host computer 2. A connection type in both of the information reading device and the host computer is not particularly limited, and, for example, in FIG. 1, the information reading device 1 performs a data communication with the host computer 2, which is provided in a remote location, by a wireless LAN through a Wi-Fi router 3.

Further, the program development support device 4 according to present embodiment 1 is connected to be capable of performing a data communication with the information reading device 1 and the host computer 2. The program development support device 4 generates a program (first program) of the information reading device 1 side and a program (second program) of the host computer 2 side, which are respectively transmitted to the information reading device 1 and host computer 2.

Figure 2:
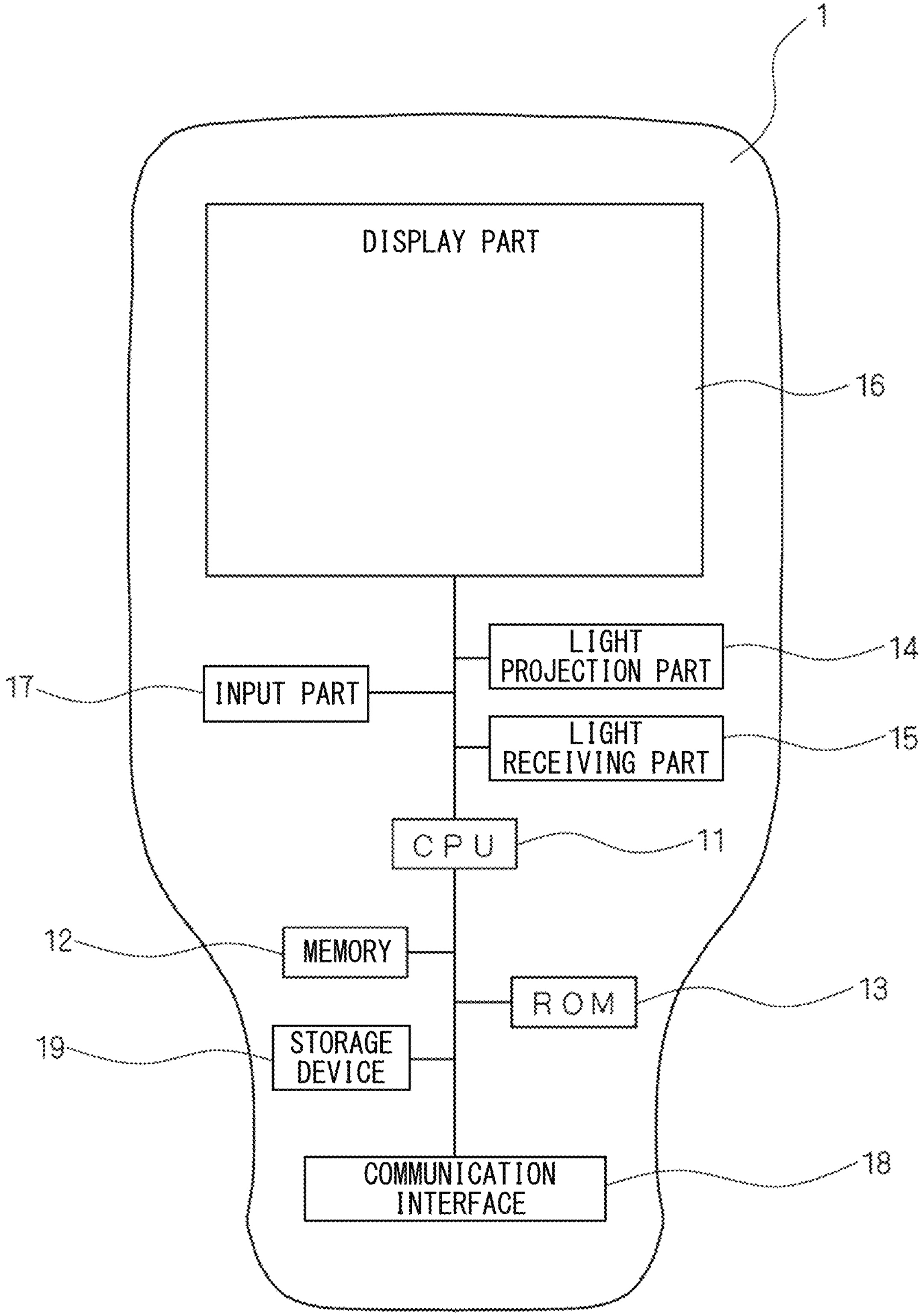
FIG. 2 is a block diagram schematically showing a configuration of the information reading device which is used in the information system according to embodiment 1 of the present invention.

FIG. 2 is a block diagram schematically showing a configuration of the information reading device 1 which is used in the information system according to embodiment 1 of the present invention. The information reading device 1 of the information system according to embodiment 1 of the present invention is provided with at least a CPU (central processing unit) 11, a memory 12, a ROM 13, a light projection part 14, a light receiving part 15, a display part 16, an input part 17, a communication interface 18, and a storage device 19.

The CPU 11 is connected with the respective aforementioned hardware parts of the information reading device 1, and controls the operations of the respective aforementioned hardware parts, and executes various software functions in accordance with the computer programs stored in the ROM 13. The memory 12 is configured with a non-volatile memory such as SRAM, SDRAM, etc., and a load module is expanded when executing the computer program, and temporary data, etc. generated at the time of the execution of the computer program is stored.

The communication interface 18 is capable of performing a data communication with the host computer 2, etc. by connecting to an external network such as an internet, a LAN, a WAN, etc. In present embodiment 1, the light receiving part 15 receives reflecting light of light emitted from the light projection part 14 of the information reading device 1. And it is decoded as a signal, and it is transmitted to the host computer 2 through the communication interface 18. Further, an operation log of the user and an action log of the device are acquired, and they are also transmitted to the host computer 2 through the communication interface 18.

The input part 17 is a menu button, a ten-key button, a cross key, a touch panel, etc., and receives inputs by the user.

Figure 3:
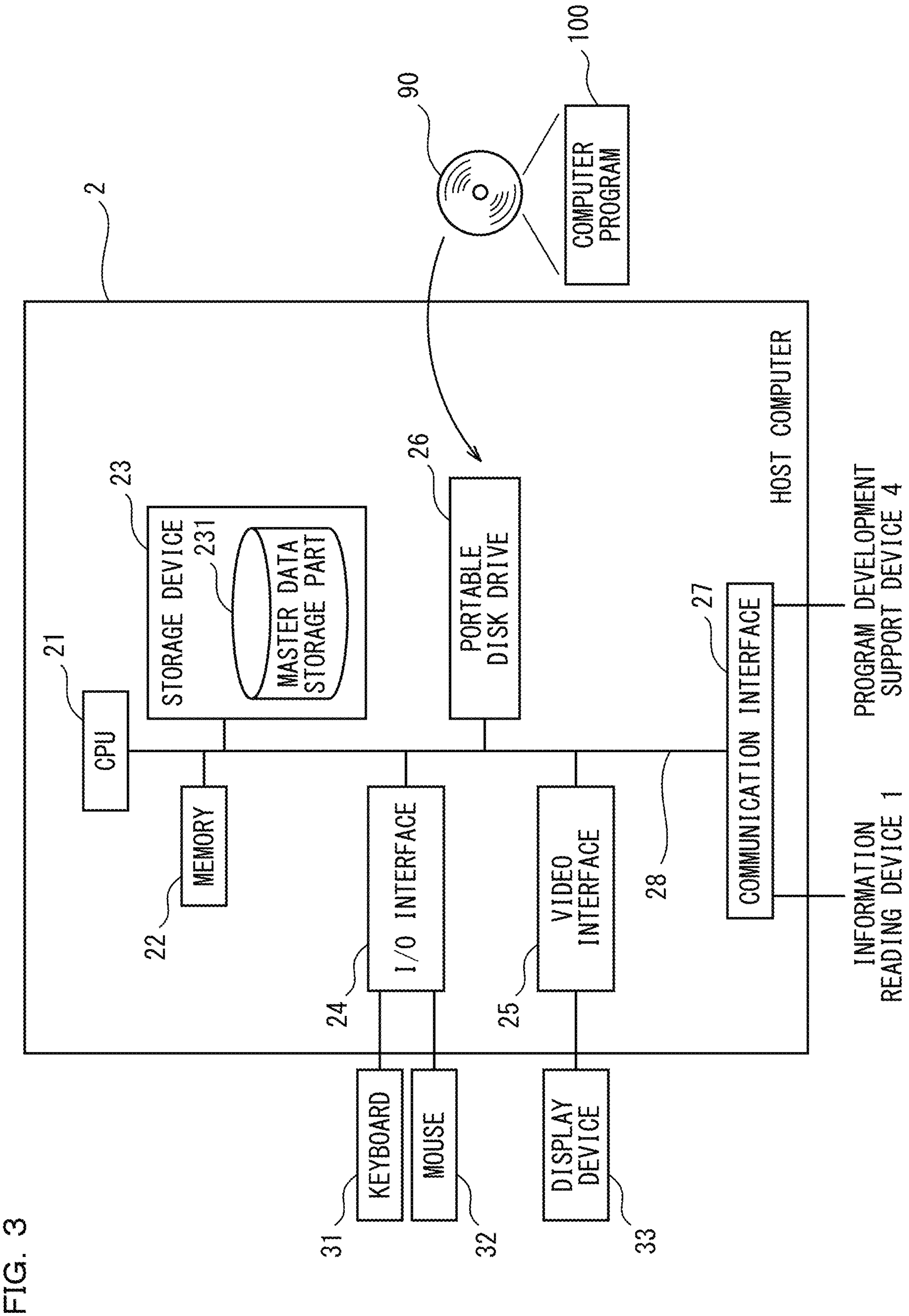
FIG. 3 is a block diagram showing a configuration of the host computer which is used in the information system according to embodiment 1 of the present invention.

FIG. 3 is a diagram showing a configuration of the host computer 2 which is used in the information system according to embodiment 1 of the present invention. The host computer 2 according to embodiment 1 of the present invention is provided with at least a CPU (central processing unit) 21, a memory 22, a storage device 23, a I/O interface 24, a video interface 25, a portable disk drive 26, a communication interface 27, and an internal bus 28 which connects with the aforementioned hardware parts.

The CPU 21 is connected to the aforementioned hardware parts of the host computer 2 through the internal bus 28, and controls the operations of the aforementioned hardware parts, and the various software functions are executed in accordance with the computer program 100 stored in the storage device 23. The memory 22 is configured with a non-volatile memory such as SRAM, SDRAM, etc., and a load module is expanded when executing the computer program 100, and temporary data, etc. generated at the time of the execution of the computer program 100 is stored.

The storage device 23 is configured with a built-in fixed storage device (hard disk), ROM, etc. The computer program 100 stored in the storage device 23 is downloaded from the portable storage medium 90 such as a DVD, a CD-ROM, etc., which stores information such as a program, data, etc., by the portable disk drive 26. And at the time of the execution, it is expanded from the storage device 23 to the memory 22 and it is executed. Further, it may be a computer program downloaded from an external computer connected through the communication interface 27.

The storage device 23 is provided with a master data storage part 231. Here, the master data means data in which data streams are stored in a plurality of fields of a plurality of records and which becomes a retrieval object. In present embodiment 1, it is designed that even though a user has no knowledge of programming languages or databases, the user can easily generate a program by specifying a correspondence relationship between a display area displayed in the information reading device 1 and a filed in the master data.

The communication interface 27 is connected to the internal bus 28 so as to be capable of performing a data communication with the information reading device 1 by connecting an external network such as an internet, a LAN, a WAN, etc.

The I/O interface 24 is connected to input devices such as a keyboard 31, a mouse 32, etc., and receives inputs such as setting data, maintenance data, etc. The video interface 25 is connected with the display device 33 such as a CRT display, a liquid crystal display, etc., and displays replay images, etc. in which operation logs and action logs are merged in time series.

Figure 4:
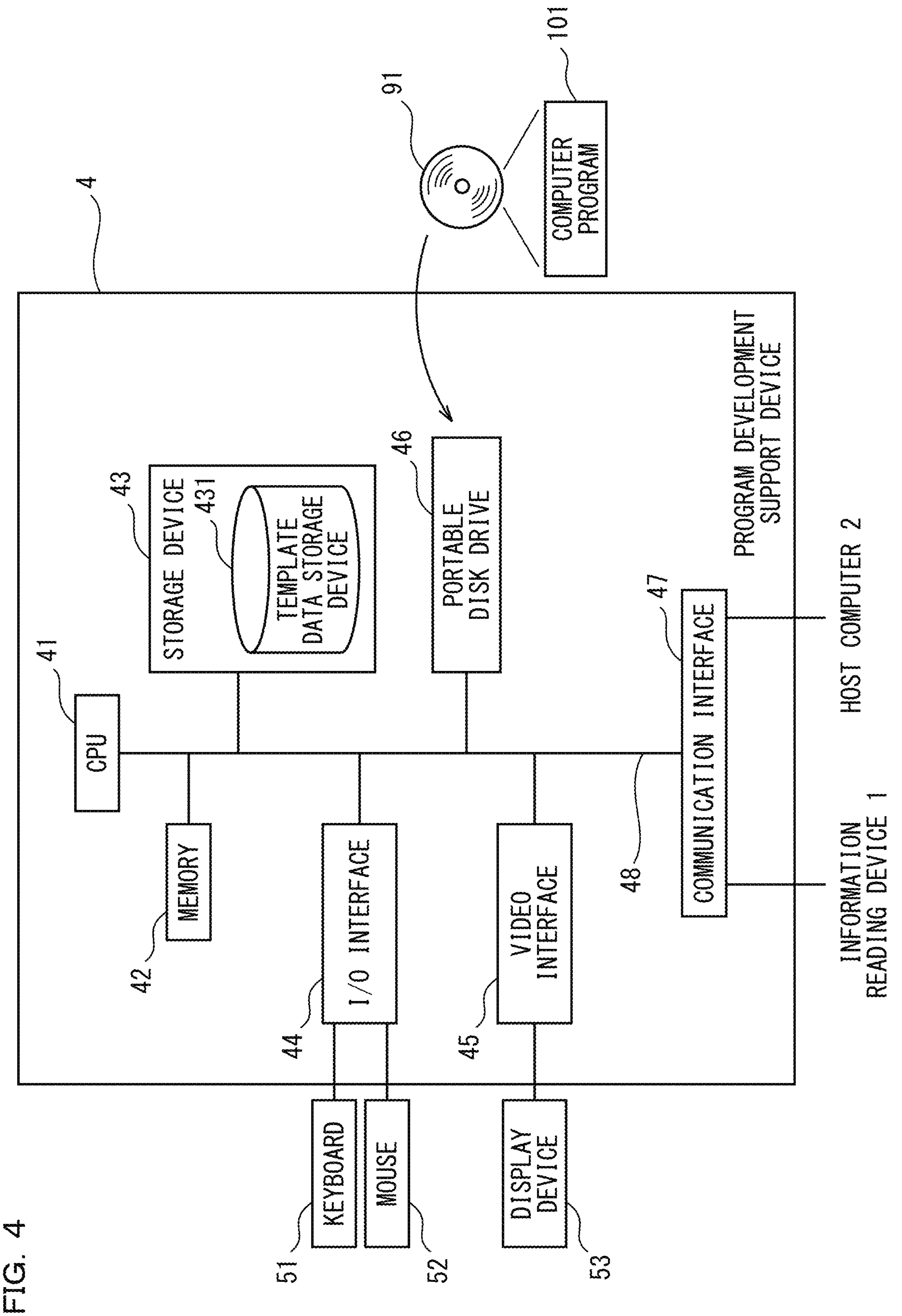
FIG. 4 is a block diagram showing a configuration of the program development support device according to embodiment 1 of the present invention.

FIG. 4 is a block diagram showing a configuration of a program development support device 4 according to embodiment 1 of the present invention. The program development support device 4 according to embodiment 1 of the present invention is provided with at least a CPU (central processing unit) 41, a memory 42, a storage device 43, a I/O interface 44, a video interface 45, a portable disk drive 46, a communication interface 47, and an internal bus 48 which connects with the aforementioned hardware parts.

The CPU 41 is connected to the aforementioned hardware parts of the program development support device 4 through the internal bus 48, and controls the operations of the aforementioned hardware parts, and the various software functions are executed in accordance with the computer program 101 stored in the storage device 43. The memory 42 is configured with a non-volatile memory such as SRAM, SDRAM, etc., and a load module is expanded when executing the computer program 101, and temporary data, etc. generated at the time of the execution of the computer program 101 is stored.

The storage device 43 is configured with a built-in fixed storage device (hard disk), ROM, etc. The computer program 101 stored in the storage device 43 is downloaded from the portable storage medium 91 such as a DVD, a CD-ROM, etc., which stores information such as a program, data, etc., by the portable disk drive 46. And at the time of the execution, it is expanded from the storage device 43 to the memory 42 and it is executed. Further, it may be a computer program downloaded from an external computer connected through the communication interface 47.

The storage device 43 is provided with a template data storage part 431. Here, the template data means data which previously sets a correspondence relationship between a predetermined field (first field) displayed in the information reading device 1 and a predetermined field (second field) in the master data of the host computer 2. By using the template data, a desired program can be set in a further short period of time without setting a correspondence relationship of the fields every time.

The communication interface 47 is connected to the internal bus 48 so as to be capable of performing a data communication with the information reading device 1 and the host computer 2 by connecting to an external network such as an internet, a LAN, a WAN, etc. In present embodiment 1, the program (first program) for the information reading device 1 and the program (second program) for the host computer 2 are generated, and the programs are respectively transmitted to the information reading device 1 and the host computer 2.

The I/O interface 44 is connected to input devices such as a keyboard 51, a mouse 52, etc., and receives inputs such as setting data, maintenance data, etc. The video interface 45 is connected with the display device 53 such as a CRT display, a liquid crystal display, etc., and displays a setting content of master data, etc.

Figure 5B:
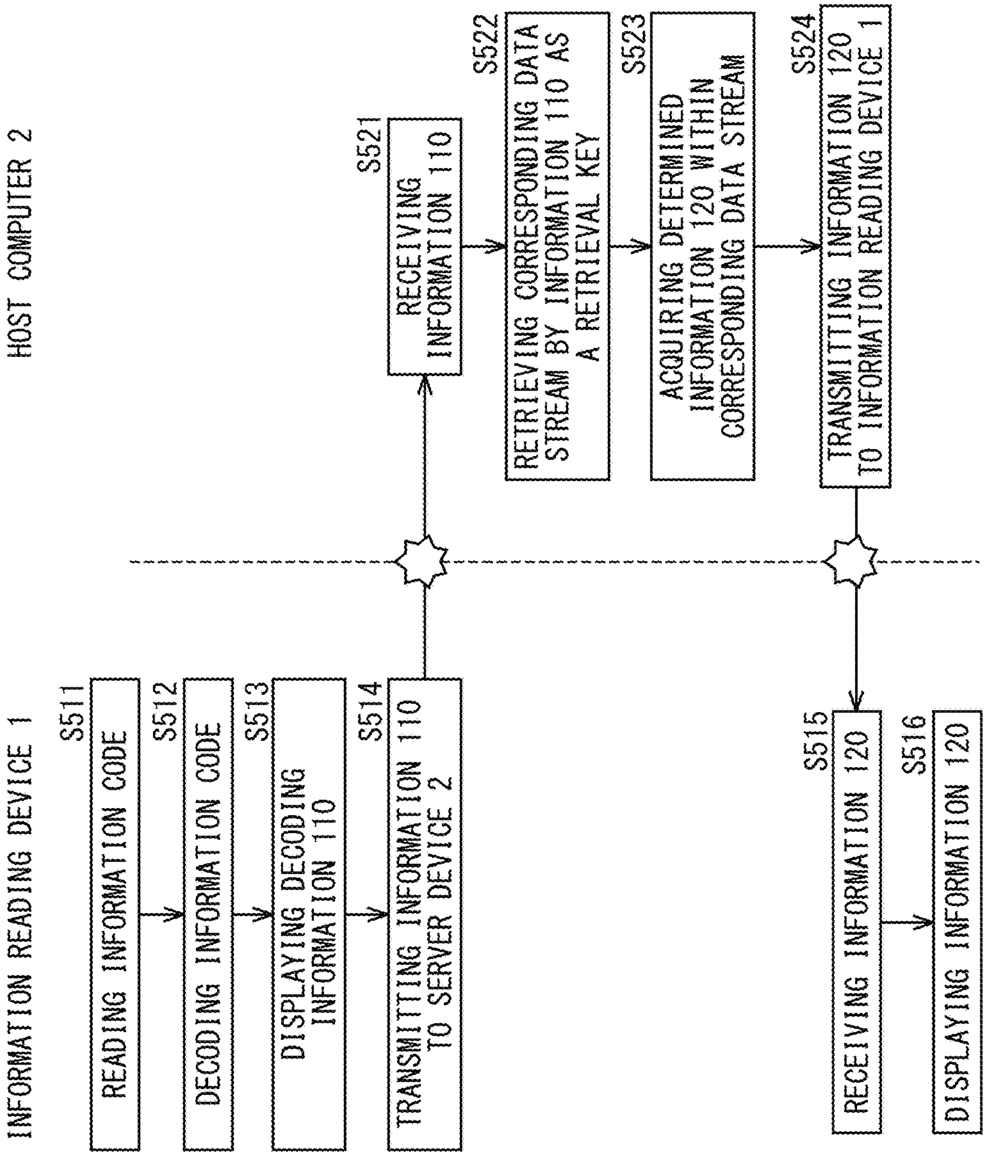
FIG. 5B is an explanatory diagram showing an overview of a program for the information reading device and a program for the host computer developed in the program development support device according to embodiment 1 of the present invention.
Figure 5A:
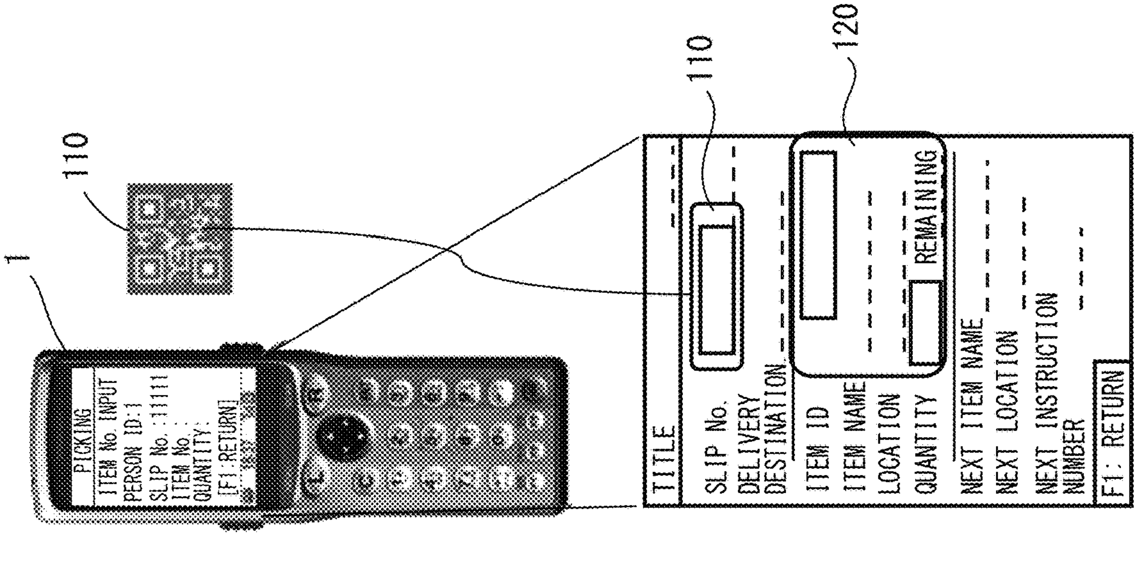
FIG. 5A a diagram showing an example of a relationship between a screen displayed in the information reading device and information used in the program according to embodiment 1 of the present invention.

FIG. 5 is an explanatory diagram showing an overview of the program for the information reading device 1 and the program for the host computer 2 developed in the program development support device 4 according to embodiment 1 of the present invention. FIG. 5A is a diagram showing an example of a relationship between a screen displayed in the information reading device 1 and information used in the program, and FIG. 5B is a flowchart showing a processing in the information reading device 1 and the host computer 2.

As shown in FIG. 5A, an information code is read by the information reading device 1 and it is transmitted to the host computer 2. Here, the read information code is decoded, and the decoded information 110 is displayed on the display. It should not necessarily be displayed, but it may be stored as internal data. That is, as shown in FIG. 5B, the CPU 11 of the information reading device 1 reads an information code (Step S511), the read information code is decoded (Step S512). The CPU 11 displays the decoded information 110 in the information reading device 1 (Step S513), and the information 110 is transmitted to the host computer 2 (Step S514).

The host computer 2 stores a database for retrieving the read data as retrieval information (retrieval key) and an access program for the database, and it has a function to perform the data communication of the retrieval information and the retrieval results. Accordingly, it may be an external device such as a personal computer (PC), or it may be an internal device, which is connected by a wireless communication such as Bluetooth (registered trademark), etc., an internal bus, and so on.

The CPU 21 of the host computer 2 receives the information 110 (Step S521), and based on the received information 110 as retrieval information, it retrieves the corresponding data stream from the master data (Step S522). The CPU 21 acquires predetermined information 120 from the retrieved (corresponding) data stream (Step S523), and the acquired information 120 is transmitted to the information reading device 1 (Step S524).

The CPU 11 of the information reading device 1 receives the information 120 (Step S515), and displays the received information 120 (Step S516).

Figure 6:
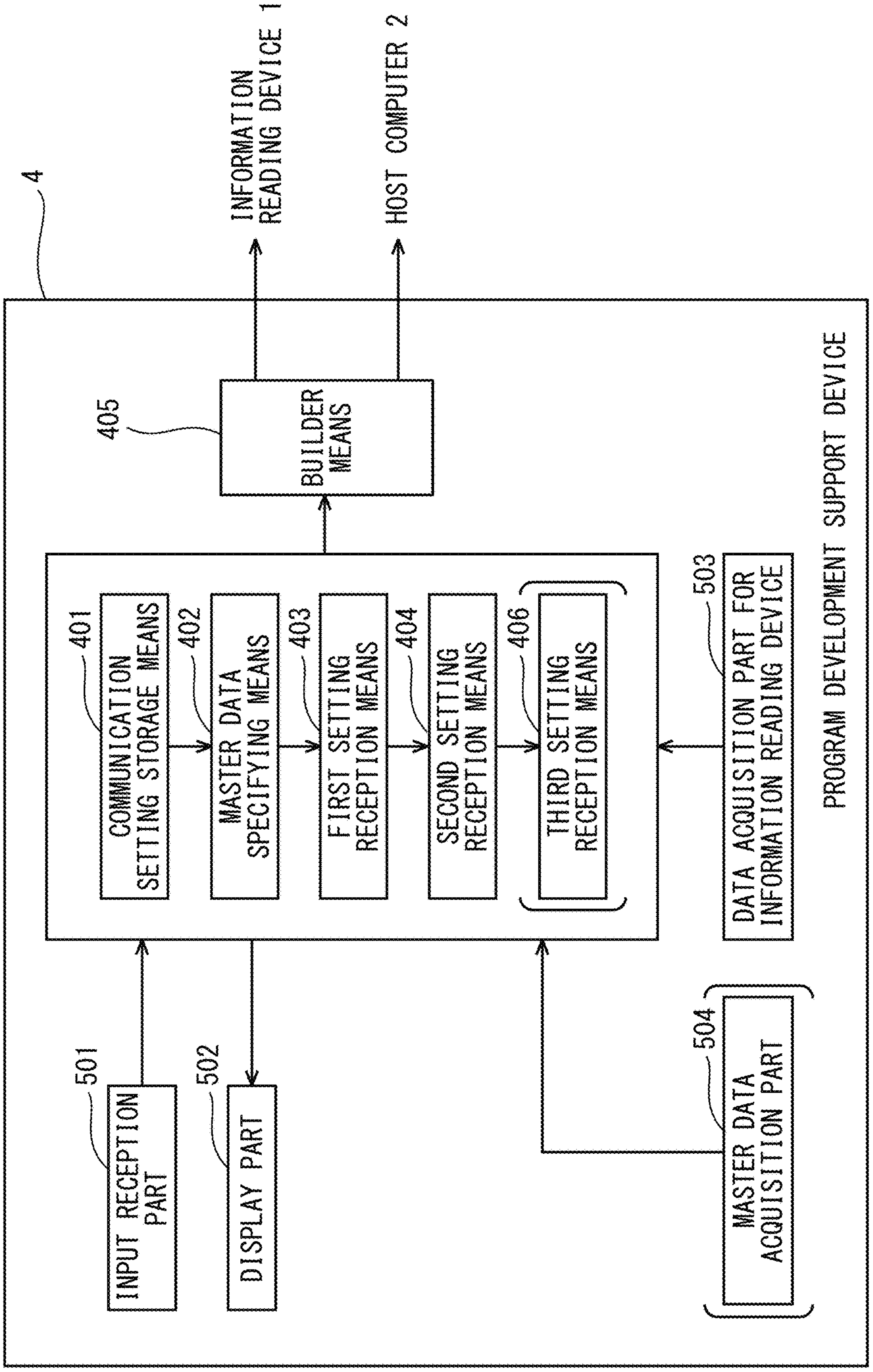
FIG. 6 is a functional block diagram of the program development support device according to embodiment 1 of the present invention.

FIG. 6 is a functional block diagram of the program development support device 4 according to embodiment 1 of the present invention. In FIG. 6, the program development support device 4 according to present embodiment 1 receives various information inputs from the input reception parts 501, and the layout information or the setting screen, etc. for displaying the input received information and the retrieval results is displayed on the display part 502. Further, the information related to the specification of the information reading device 1, etc. is acquired from the data acquisition part 503 for the information reading device 1. Accordingly, the first program in accordance with the specification of the connected information reading device 1 can be generated.

Further, the communication setting storage means 401 stores a communication route of the data transmission reception between the information reading device 1 and the host computer 2, which are capable of performing a data communication to each other, in the storage device 43. The communication route means the entire information related to the communication route which is necessary at the time of data communication such as, for example, whether or not the mutual access between the information reading device 1 and the host computer 2 is allowed, a communication protocol, setting of data stream to be transmitted, etc. At the same time, it can perform a setting of an IP address of a communication destination or a file transfer port of a communication destination, etc.

The master data specifying means 402 receives the specification of the master data stored in the host computer 2. Accordingly, even when there is a plurality of master data in the host computer 2, the master data to be used can be specified. When the master data is not stored in the host computer 2, new master data is downloaded through the master data acquisition part 504 or it may be created.

Figure 7:
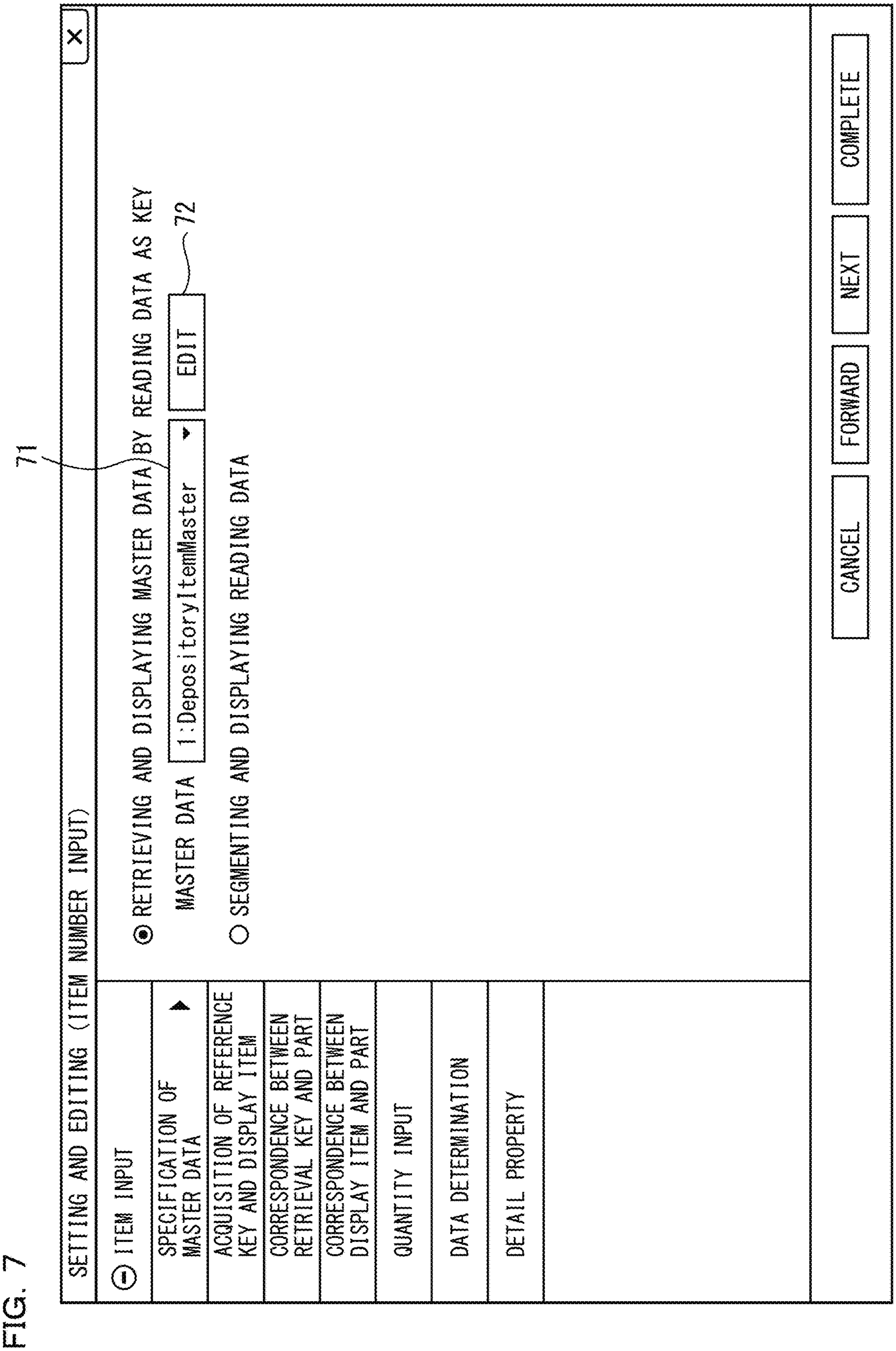
FIG. 7 is a diagram showing an example of a master data specifying screen of the program development support device according to embodiment 1 of the present invention.

FIG. 7 is a diagram showing an example of a master data specifying screen of the program development support device 4 according to embodiment 1 of the present invention. As shown in FIG. 7, the reading data based on the information code read by the information reading device 1 is treated as the retrieval information, and the master data as a retrieval object is specified in the master data specifying area 71. It may be selected in a pull-down menu, or it may be directly inputted by selecting an "editing" button 72.

Figure 8:
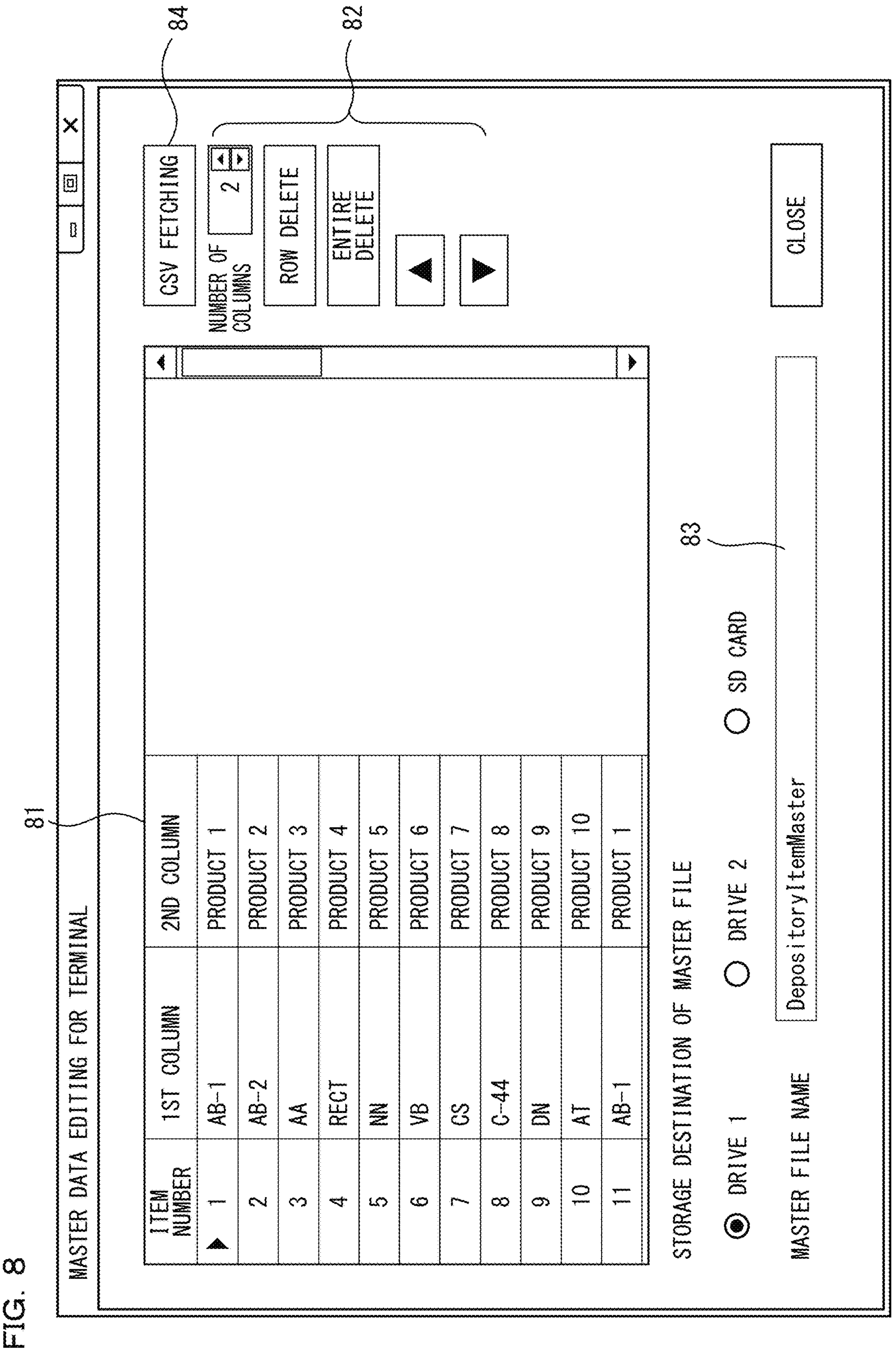
FIG. 8 is a diagram showing an example of a master data editing screen of the program development support device according to embodiment 1 of the present invention.

FIG. 8 is a diagram showing an example of a master data editing screen of the program development support device 4 according to embodiment 1 of the present invention. As shown in FIG. 8, the editing can be performed while displaying the master data in the master data editing area 81.

The editing work is performed through an operation part 82. Further, the master data may be newly created, or a CSV file, which is created in an external part, may be acquired by selecting a CSV fetching button 84. The created or edited master data can be stored by specifying the file name in a file name specifying area 83.

Returning to FIG. 6, the first setting reception means 403 receives a selection of the first field, which becomes a retrieval processing object, from the plurality of fields within the specified master data, and receives a selection of the second field, in which the retrieval result data to be displayed is stored, from the plurality of fields corresponding to the record which is corresponded with the retrieval information. The retrieval information is not particularly limited, and it may be an information code read by the information reading device 1, data in which some kind of arithmetic processing is applied to the read information code, first few digits of data of the information code, etc.

When the selection of the second field is received, it is not limited to a case in which the retrieval information and the information in the field are exactly matched. The field matching with a comparison condition such as a prefix matching, a suffix matching, etc. may be the selection of the second field in which the retrieval result data to be displayed is stored.

A character string processing such as a division processing, an unnecessary data deletion processing, a control code conversion processing, a segmentation processing based on a predetermined format, etc. may be set for the read data. In this case, the data can be separately displayed or the processed data can be displayed. Further, a function, which sets a branch condition for a screen transition or a notification as an input of the read data, may be provided.

FIG. 9 is a diagram showing an example of a setting screen of retrieval information (retrieval key) of the program development support device 4 according to embodiment 1 of the present invention. As shown in FIG. 9, whether the read data is entirely used or whether a range segmenting a character string is specified can be selected through a character string range specifying area 92. Further, an unnecessary character in the data can be deleted through a character deletion area 93.

Figure 10:
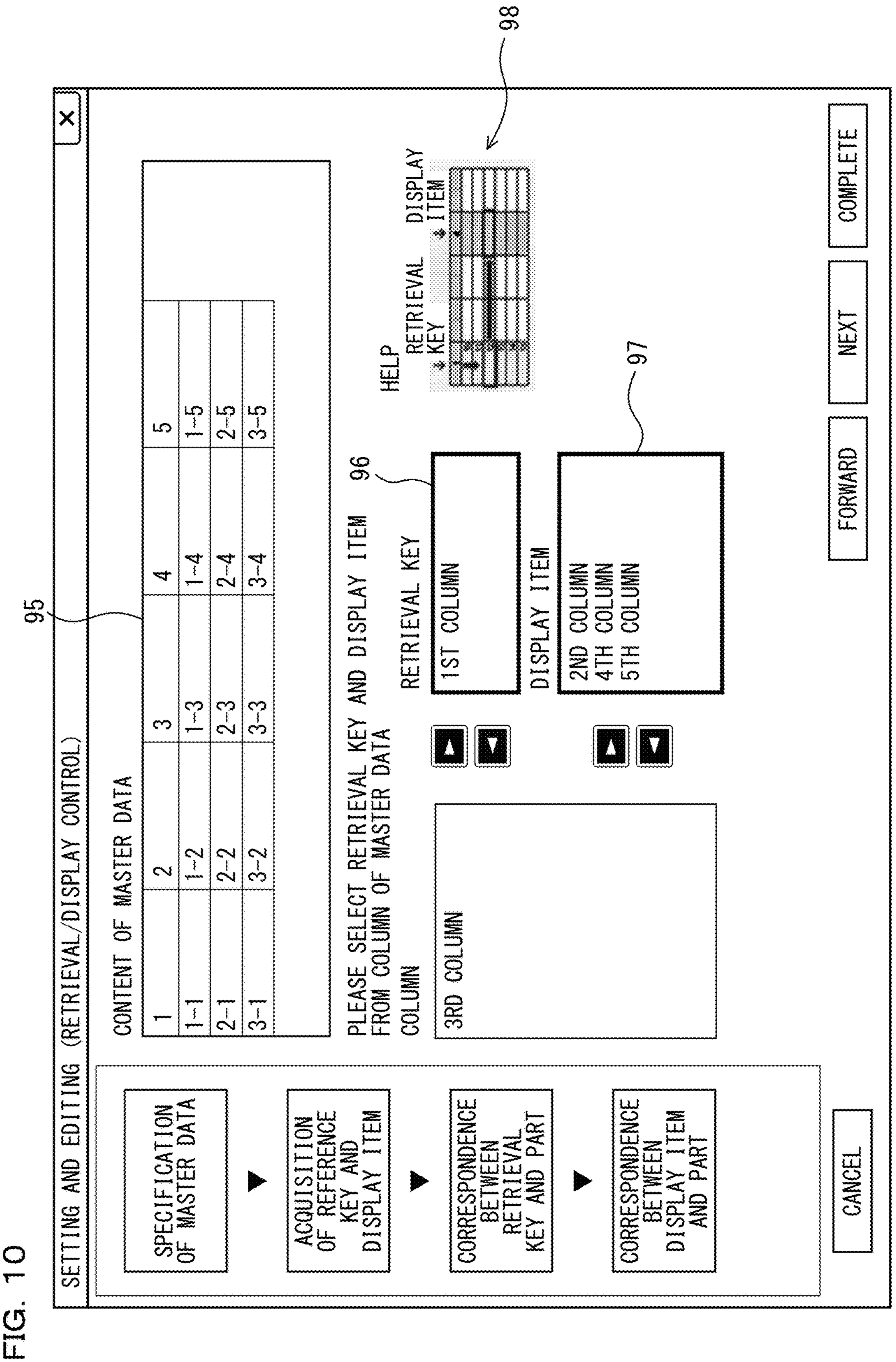
FIG. 10 is a diagram showing an example of a master data setting screen of the program development support device according to embodiment 1 of the present invention.

FIG. 10 is a diagram showing an example of a master data setting screen of the program development support device 4 according to embodiment 1 of the present invention. As shown in FIG. 10, the contents of the master data specified as a setting object are previewed in a master data display area 95. The preview of the master data is not necessarily actual data, but it may be data showing format itself, or it may be data showing a type of the master data.

A specification of a column selected as a retrieval object is received in a retrieval object specifying area 96, and a specification of a column displaying the retrieval results is received in a display item area 97. An index of the retrieval information may be added to the specified retrieval object column, or a selection of a matching method (exact matching, prefix matching, a suffix matching, etc.) may be received. Further, an icon, etc. showing a selection status or a setting change status may be added to the selected/setting changed columns as the retrieval object column and the column displaying retrieval results, and it may be displayed in the master data display area 95.

In the screen preview area 98 showing a screen image of the information reading device 1, as a function supporting the selection of a retrieval object and data input, etc., each of the output elements is numbered, and a supporting information such as a display of an icon showing a selection state, etc. can be displayed. Further, it is not only preview, but also a function which can add and delete an output element and change the setting, and a function which selects a desired output element as an output element displaying a retrieval object and data input by a mouse operation such as a drag-and-drop operation, a double-click operation, etc.

Further, the retrieval information may be acquired by performing key inputs from the information reading device 1. In this case, the data inputted by performing key inputs is converted to electronic data (text data) in the information reading device 1, and the converted electronic data is used as the retrieval information.

Returning to FIG. 6, the second setting reception means 404 is corresponded with an output element used for inputting or displaying the first field and the reading data, and is corresponded with an output element used for displaying the second field and the retrieval result data. The output element means a part receiving the user's inputs on the display device of the information reading device 1, information stored inside the information reading device 1, or information set and acquired by the user's control. In the present embodiment, it means a frame part showing a display area on the screen, internal data such as identification information, date information, time information, etc. stored inside the information reading device 1, or a display device such as LED, etc.

For example, after transmitting the retrieval result data from the host computer 2 to the information reading device 1, other than the display of the retrieval result data on the display screen of the information reading device 1, by lighting or flashing a LED lamp, vibrating, or generating sound, an output element which recognizes the user may be used. In this case, the second field is corresponded with the output element.

Figure 11:
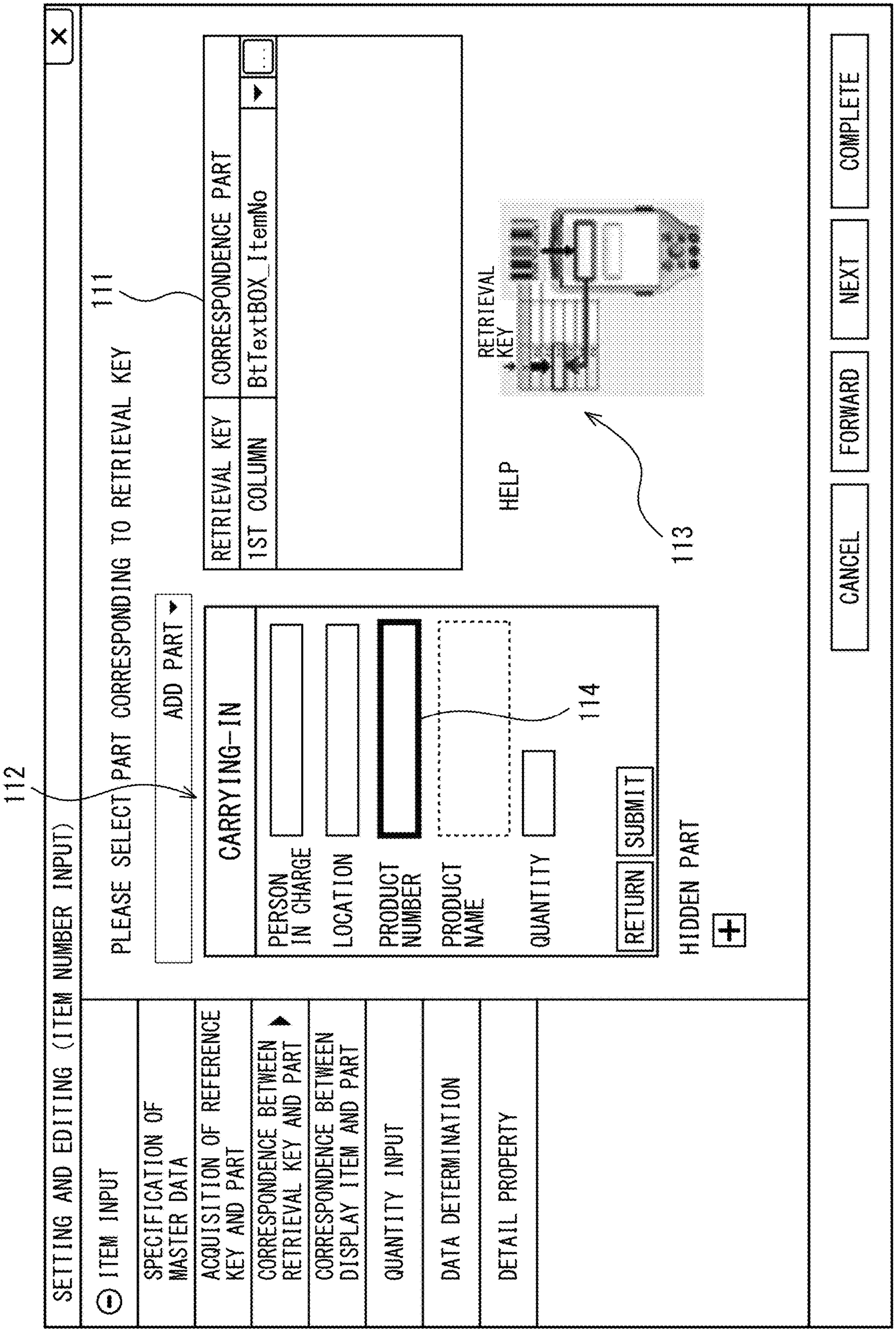
FIG. 11 is a diagram showing an example of an output element setting screen of the program development support device according to embodiment 1 of the present invention.

FIG. 11 is a diagram showing an example of an output element setting screen of the program development support device 4 according to embodiment 1 of the present invention. As shown in FIG. 11, in an output element (corresponding part) setting area 111, a pull-down menu in each specified retrieval object is provided, and a setting of a desired output element among the output elements preliminary and respectively stored can be received. In a case of associating with the output element, when the output element is configured with a plurality of elements such as a setting data format, an attachment information setting, association destination which is grid, etc., it is preferable to provide a function which can perform detailed setting.

Further, a screen image 112 displayed on the display part of the information reading device 1 is shown, and a setting of a field 114 in which an output element, which receives the setting, is displayed is received. Accordingly, the output element, which receives the setting, can be set in a manner of displaying a rectangular frame in which, for example, the display color is "red", in a display area corresponding to "item number."

In a screen preview area 113 showing a screen image of the information reading device 1, as a function supporting a selection of retrieval result, a segmentation result, etc., a number is applied to each of the output elements, and a supporting information such as a display of an icon showing a selected state, etc. can be displayed. Further, it is not only preview, but also a function which can add and delete an output element and change the setting, and a function which selects an output element displaying retrieval results and segmentation results by a mouse operation such as a drag-and-drop operation, a double-click operation, etc.

In a similar manner, FIG. 12 is a diagram showing an example of another output element setting screen of the program development support device 4 according to embodiment 1 of the present invention. As shown in FIG. 12, in the output element (corresponding part) setting area 111, a pull-down menu in each specified retrieval result data is provided, and a setting of a desired output element among the output elements preliminary and respectively stored can be received. Further, it may be provided with a function which associates with an icon showing a conversion, an image file, a notification function of various LEDs, etc. to the specified retrieval result data. In addition, it may be provided with a function which performs a data processing of character string segmentation, etc., or a setting of branch condition, etc.

The screen image 112 displayed on the display part of the information reading device 1 is displayed, and the selection of a field 115 displaying an output element, which receives a setting, is received. Accordingly, the output element, which receives the setting, can be set in a manner of displaying a rectangular frame in which, for example, the display color is "red", in a display area corresponding to "item name." With this, by displaying a correspondence relationship between the first field displayed in the information reading device 1 and the second field of the master data of the host computer 2 on the screen, the user can perform the setting while confirming the correspondence relationship without any mistakes.

Further, in order to reduce the development time, a template data in which the correspondence relationship between the first field displayed in the information reading device 1 and the second field of the master data of the host computer 2 is preliminary set may be used. In this case, the setting of the correspondence relationship in each field as described above is not required, so that it is possible to generate a desired program in a short period of time. Further, as an object for the reduction of the development time, other than the template data, it may be provided with a function (favorite registration) in which a plurality of output elements can be collectively registered, edited, or reproduced, or a function which can perform registration/edit/reproduction as a project unit, a menu unit, or a screen unit.

Returning to FIG. 6. a builder means 405 generates the first program and the second program based on the first field which receives the setting, the second field which receives the setting, and the corresponding respective output elements.

Figure 13:
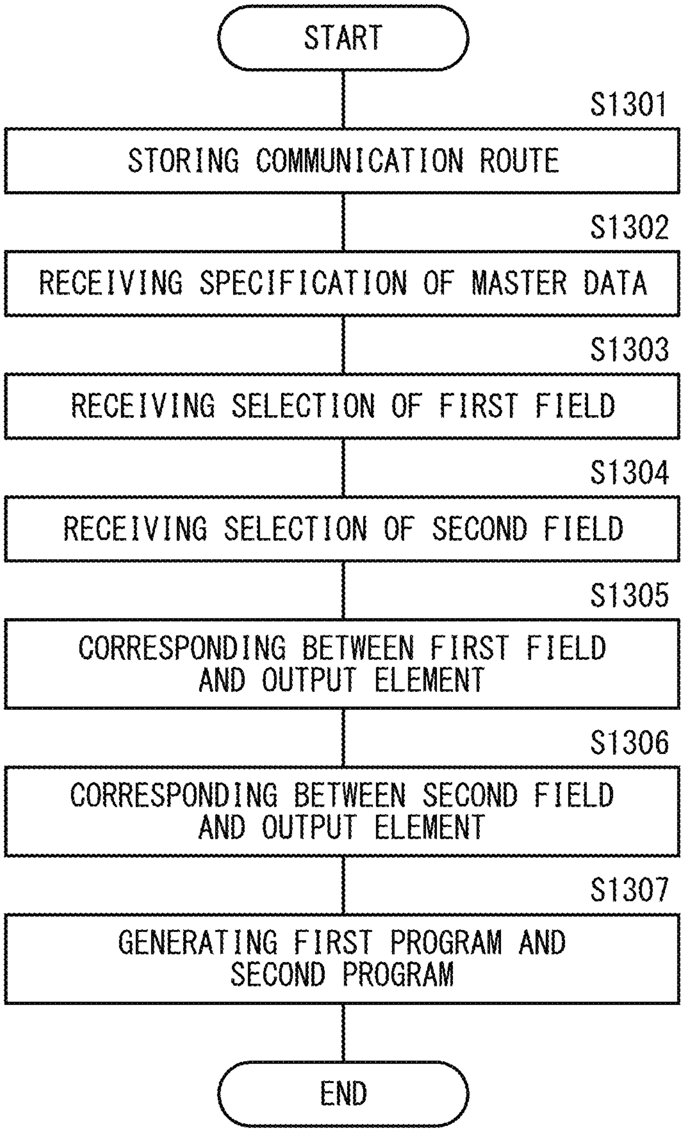
FIG. 13 is a flowchart showing a program generating procedure of the CPU of the program development support device according to embodiment 1 of the present invention.

FIG. 13 is a flowchart showing a program generating procedure of the CPU 41 of the program development support device 4 according to embodiment 1 of the present invention. As shown in FIG. 13, the CPU 41 of the program development support device 4 stores a communication route of data transmission reception between the information reading device 1 and the host computer 2, which are capable of performing a data communication to each other, in the storage device 43 (Step S1301). The host computer 2 is not necessarily an individual device, but it may be provided inside the same device. In this case, it may be operated in a predetermined communication route, so that a setting of a communication route is not always required.

The CPU 41 receives the specification of the master data stored in the host computer 2 (Step S1302). Accordingly, even when a plurality of master data is stored in the host computer 2, the master data to be used can be specified. When the master data is not stored in the host computer 2, master data is newly created.

The CPU 41 receives the selection of the first field, which is an object of a retrieval processing, from the plurality of fields in the specified master data (Step S1303), and receives the selection of the second field, in which the retrieval result data to be displayed is stored, from the plurality of fields corresponding with the record which corresponds with the retrieval information (Step S1304). The retrieval information is not particularly limited, but it may be an information code read by the information reading device 1, data in which some kind of arithmetic processing is applied to the read information code, first few digits of data of the information code, etc.

The CPU 41 controls to correspond with an output element used for inputting or displaying the first field and the reading data (Step S1305), and controls to correspond with an output element used for displaying the second field and the retrieval result data (Step 1306). The CPU 41 controls to generate the first program and the second program based on the first field which receives the selection, the second field which receives the selection, and the corresponding respective output elements (Step S1307).

Figure 14:
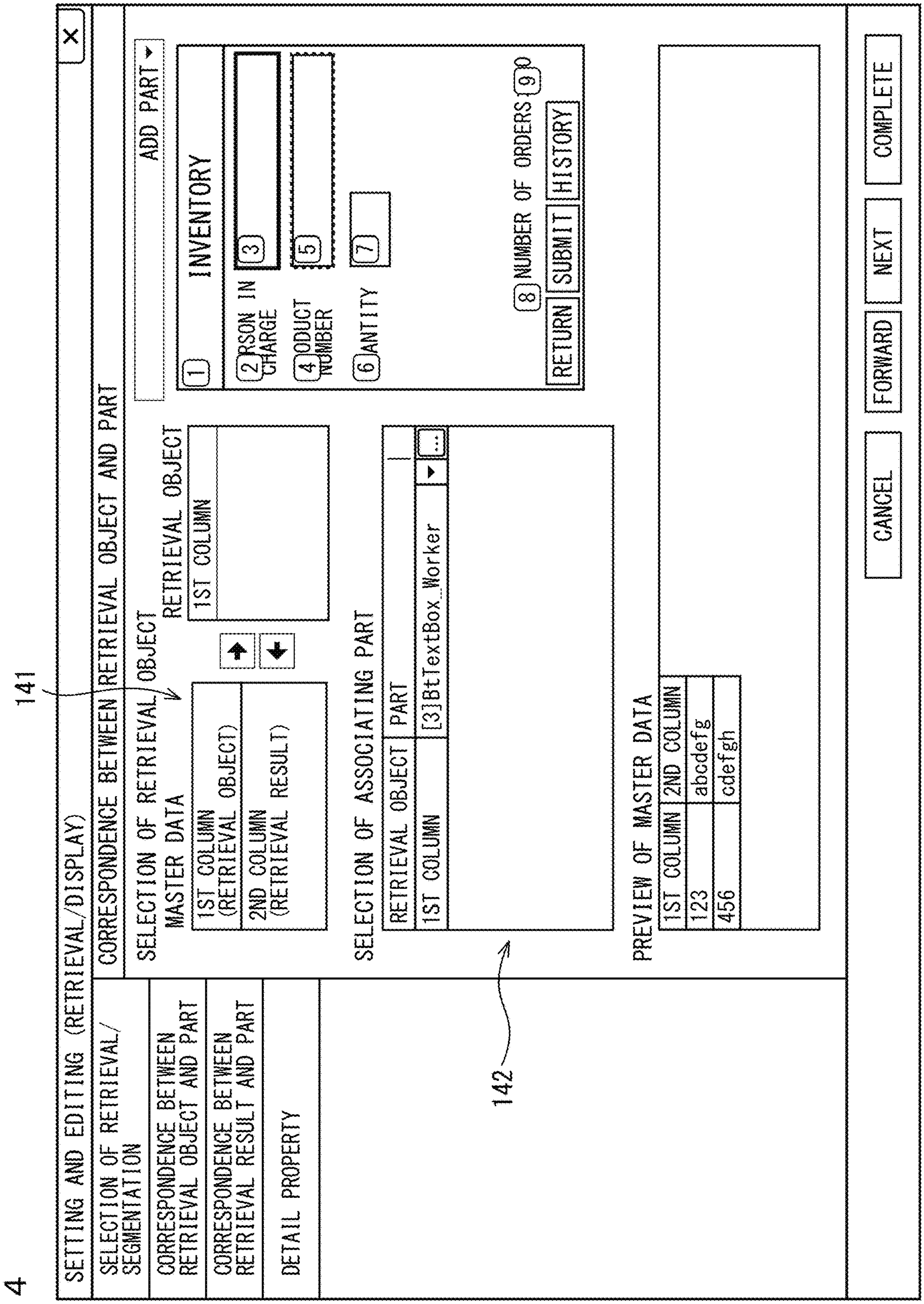
FIG. 14 is a diagram showing an example of a selection receiving screen of the program development support device according to embodiment 1 of the present invention.

The setting order of the first setting reception means 403 and the second setting reception means 404 is not limited to this order. FIG. 14 is a diagram showing an example of a selection receiving screen of the program development support device 4 according to embodiment 1 of the present invention.

In the example shown in FIG. 14, the settings are received in an order of Step S1303, Step S1305, Step S1304, and Step S1306 which are described in FIG. 13. That is, in FIG. 14, the selection of the first field of Step S1303 is received in a "retrieval object" selection specifying area 141. The setting of the correspondence between the first field and the output element in Step S1305 is received in a "associating part" selection specifying area 142.

In a similar manner, FIG. 15 is a diagram showing another example of the selection receiving screen of the program development support device 4 according to embodiment 1 of the present invention. In FIG. 15, the selection of the second field of Step S1304 is received in a "retrieval result" selection specifying area 151. The setting of the correspondence between the second field of Step S1306 and an output element is received in an "associating part" selection specifying area 152.

Figure 16:
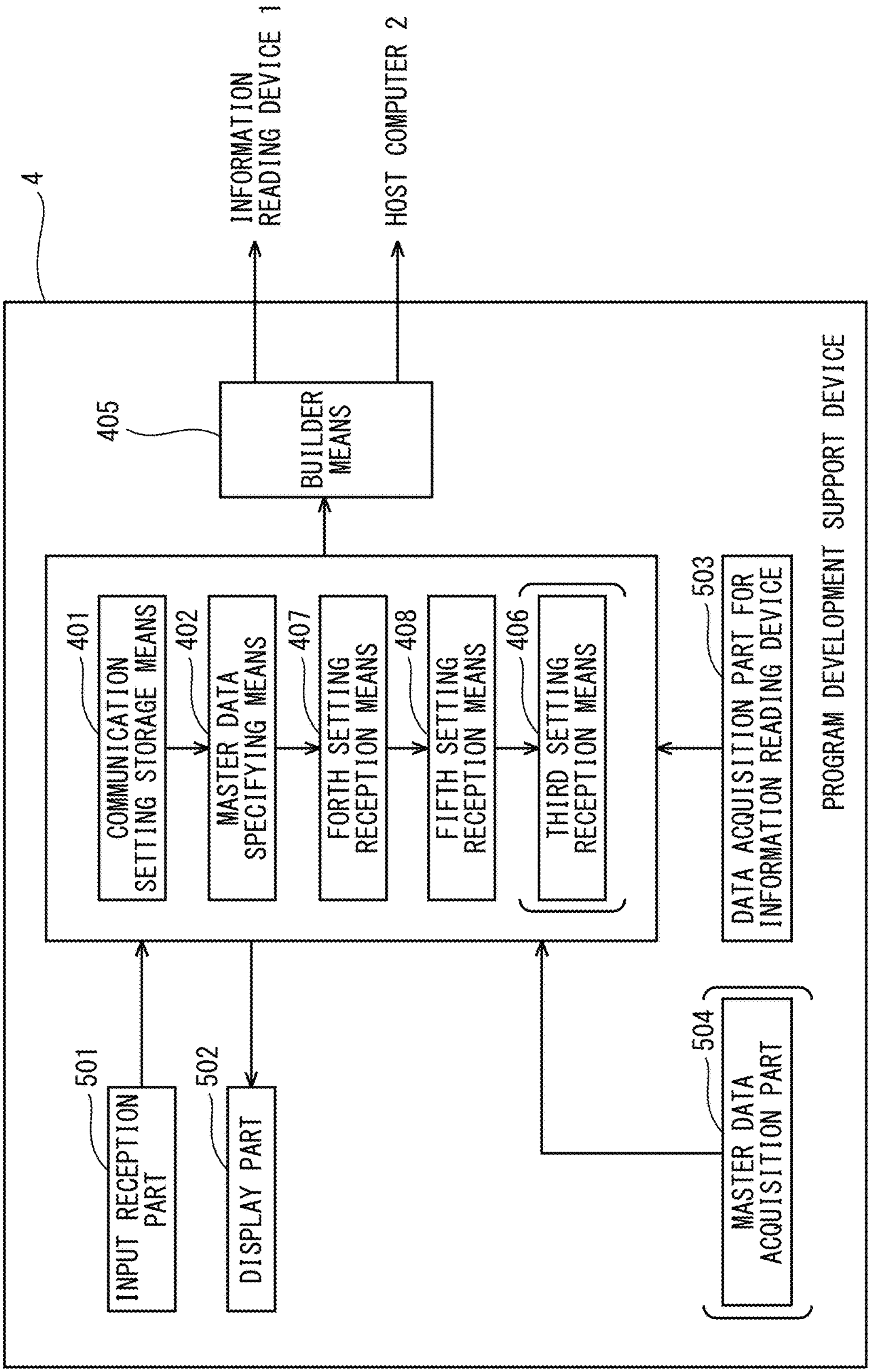
FIG. 16 is another functional block diagram showing the program development support device according to embodiment 1 of the present invention.

FIG. 16 is another functional block diagram showing the program development support device 4 according to embodiment 1 of the present invention.

In FIG. 16, the fourth setting reception means 407 and the fifth setting reception means 408 only differ from FIG. 6. The fourth setting reception means 407 associates with an output element used for inputting or displaying the reading data in each field within the master data which is specified, and associates with an output element used for displaying the retrieval result data in each field within the master data which is specified. That is, first, the setting of the output elements which are displayed in the information reading device 1 is performed.

Further, the fifth setting reception means 408 receives the selection of the first field, in which the reading data to be displayed is stored, from a plurality of fields within the master data corresponded with the output elements, and receives the selection of the second field, in which the retrieval result data to be displayed is stored, from a plurality of fields corresponding to a record which corresponds with the retrieval information. Accordingly, even if the correspondence relationship is set after the setting of the output elements was received, the similar effect can be expected.

Further, whether or not the retrieval information, in which the information code is read, or whether or not the retrieved result is correct may be confirmed by providing the third setting reception means 406. As shown in FIG. 6, by providing the third setting reception means 406, the selection of the third field inputting or displaying the reading data based on the information code read in the information reading device 1 from a plurality of fields is received. Accordingly, it is possible to confirm whether or not the operation is correctly performed by performing the collation between the selected third field and the first field or the second field.

Further, in the examples described above, the generation of the program for the information reading device 1 was described as an example, but a program for the host computer 2 is generated in a similar manner as the aforementioned processing procedures. That is, in the builder means 405, the program (second program) in the host computer 2 side is generated based on the first field and the second field which are selected in the first setting reception means 403, and the stored communication route.

Figure 17:
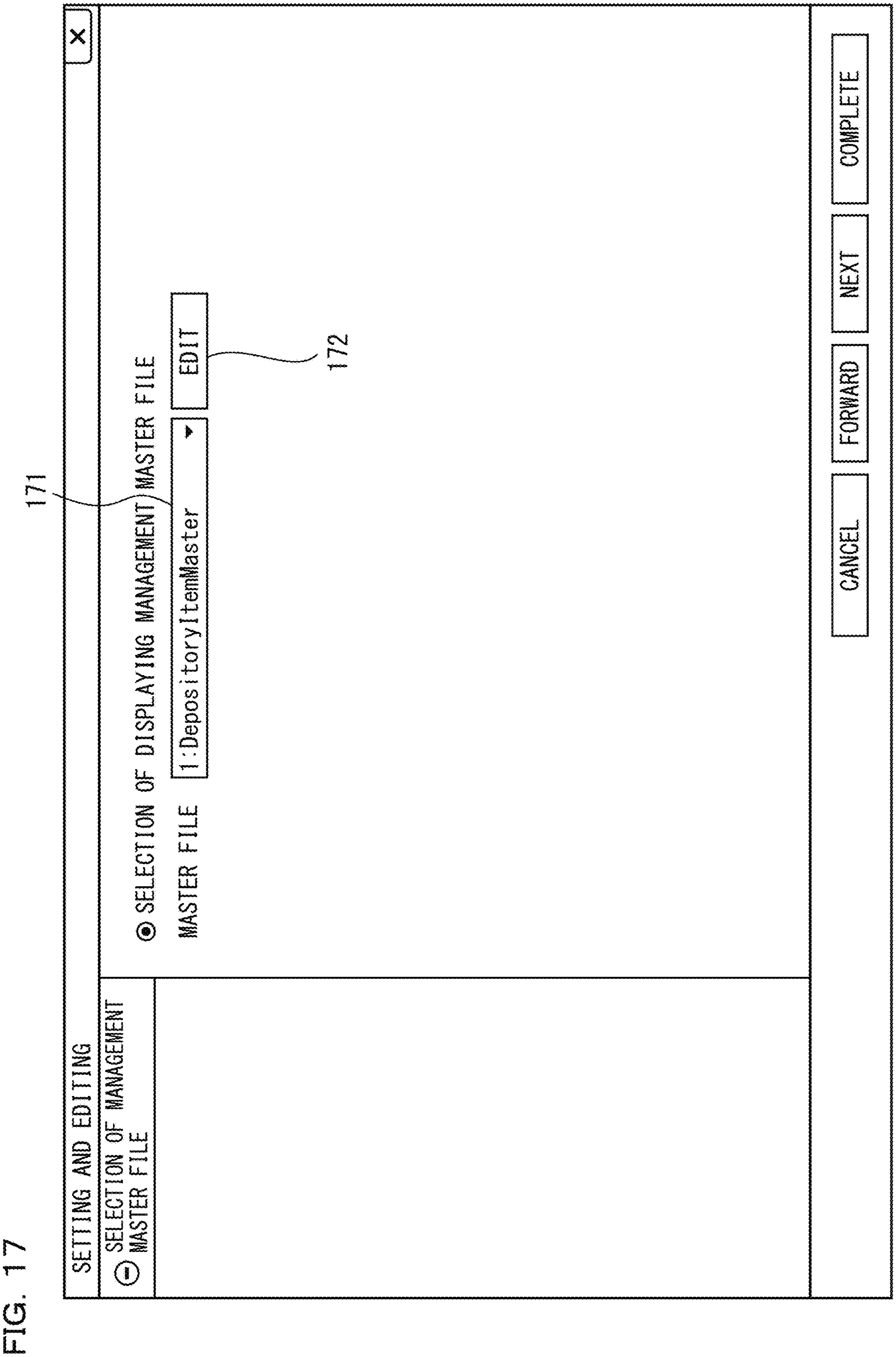
FIG. 17 is a diagram showing an example of a master data specifying screen of the program development support device according to embodiment 1 of the present invention.

FIG. 17 is a diagram showing an example of a master data specifying screen of the program development support device 4 according to embodiment 1 of the present invention. In a similar manner as FIG. 7, as shown in FIG. 17, the reading data based on the information code read by the information reading device 1 is treated as the retrieval information, and the master data as a retrieval object is specified in a master data specifying area 171. The selection may be received by the pull-down menu, or it may be directly inputted by selecting an "edit" button 172.

Figure 18:
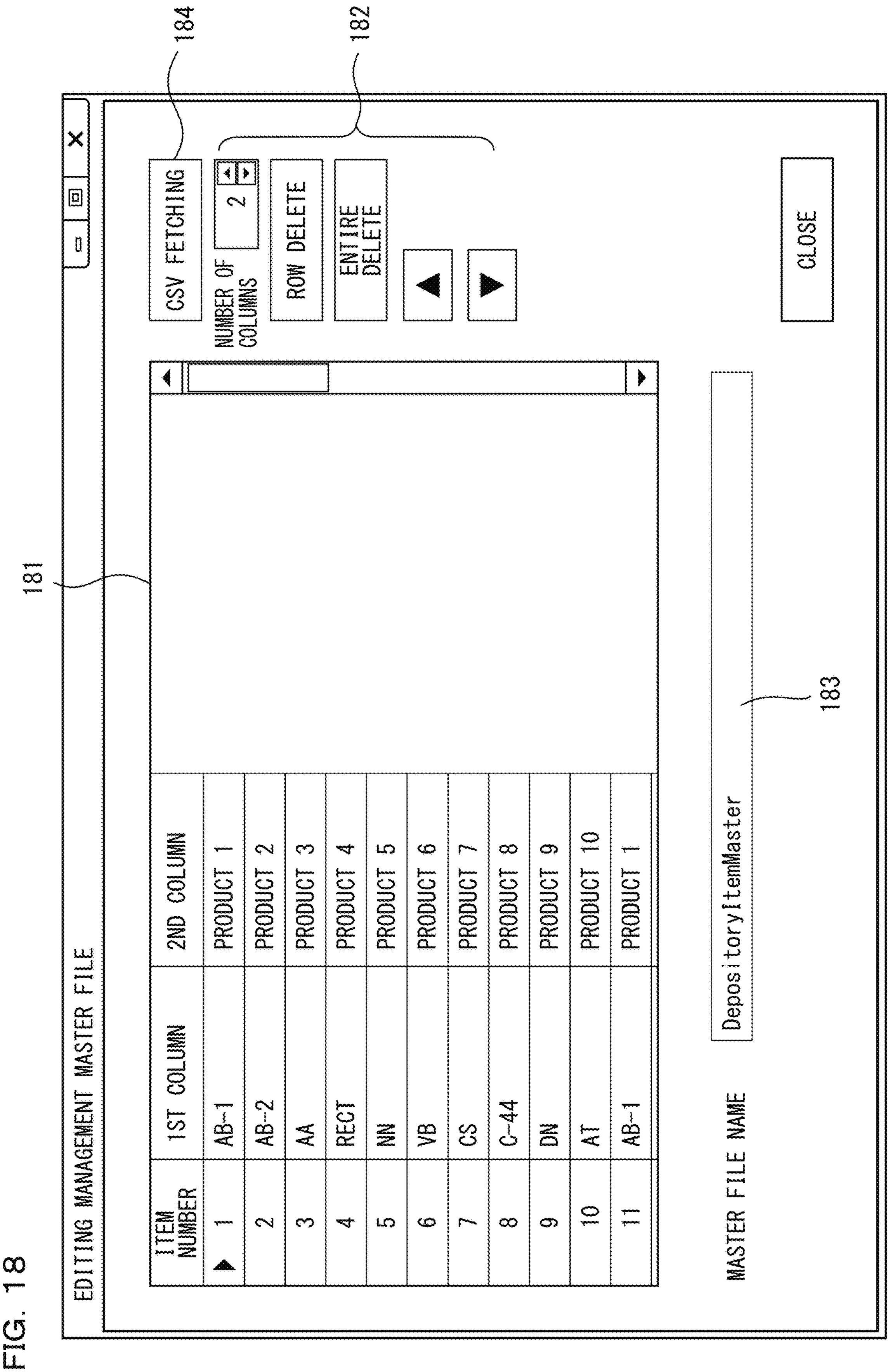
FIG. 18 is a diagram showing an example of a master data editing screen of the program development support device according to embodiment 1 of the present invention.

FIG. 18 is a diagram showing an example of a master data editing screen of the program development support device 4 according to embodiment 1 of the present invention. In a similar manner as FIG. 8, as shown in FIG. 18, the edit can be performed while displaying the master data in a master data editing area 181.

The editing work is performed through an operation part 182. Further, master data may be newly created. Alternatively, by selecting a CSV fetching button 184, a CSV file which is created in an external part may be acquired. The created or edited master data can be stored by specifying a file name in a file name specifying area 183.

FIG. 19 is diagram showing an example of a setting screen of data, which becomes master data of the program development support device 4 according to embodiment 1 of the present invention, and a database processing of the data. The data to be the master data is, for example, a CSV file, a database file, etc. As shown in FIG. 19, the specification of the master data is received in a master data specifying area 191.

Further, in a setting area 192, the setting for associating the specified master data with data inputted by the information reading device 1 or the output element of the displayed data, and the setting for associating with the database processing are received. In "management table column", the setting for associating the columns of the master data with the output elements of the information reading device 1 is received.

In the example shown in FIG. 19, the output elements of the information reading device 1 and the columns of the master data are associated, but it is not particularly limited to this. For example, an icon showing the output elements of the information reading device 1 may be associated with the columns of the master data. The information indicating data format stored in the information reading device 1 may be associated with the columns of the master data. Further, in contrary, the information indicating the columns of the master data may be associated with the output elements of the information reading device 1 or the information indicating data format stored in the information reading device 1.

In addition, it may be provided with functions for setting a database processing (reference processing, overwrite processing, additional processing, etc.) to the master data, an arithmetic processing (addition processing, subtraction processing, etc.) to the data, a conversion processing (data form conversion processing, date format conversion processing, etc.), an error processing (duplicate data deletion processing, error notification processing, etc.) at the time of transmission reception data or database processing.

The aforementioned data format stored in the information reading device 1 means data inputted by the output elements of the information reading device 1, the displayed data, or the information indicating data format storing or outputting internal data.

FIG. 20 is a diagram showing an example of an output data registration/editing screen of the program development support device 4 according to embodiment 1 of the present invention. As shown in FIG. 20, the selection of registration/output data is received in an output data selection area 201, and it can be registered or edited as output data in an output data registration area 202. At the same time, the setting of a character string processing or an arithmetic processing to the output data, and the setting of the format information such as variable length/fixed length of the output data, delimiting character, etc. can be received.

FIG. 21 is a diagram showing an example of the second program screen of the program development support device 4 according to embodiment 1 of the present invention. As shown in FIG. 21, it is provided with a function which displays master data (upper side of screen) such as inventory management data, etc. and storage data (lower side of screen) from the information reading device 1, and a function which displays a notification and an error log when an error occurs at the time of data transmission reception, database processing, etc. Further, an execution of a database retrieval processing, a display of lists in which the extraction processing was previously executed, an execution of a database update processing, an execution of a data reading and output processing, a printing of display data and bar code data, etc. can be performed.

In the example shown in FIG. 21, a display of various databases (management master file such as an inventory management master, etc. and storage log database), and the second program having an interface which executes an update processing are shown. However, it does not necessarily provide the user interface. It may be only provided with the data transmission reception without the user interface, or the data processing may be applied to the data transmission reception.

Figure 22:
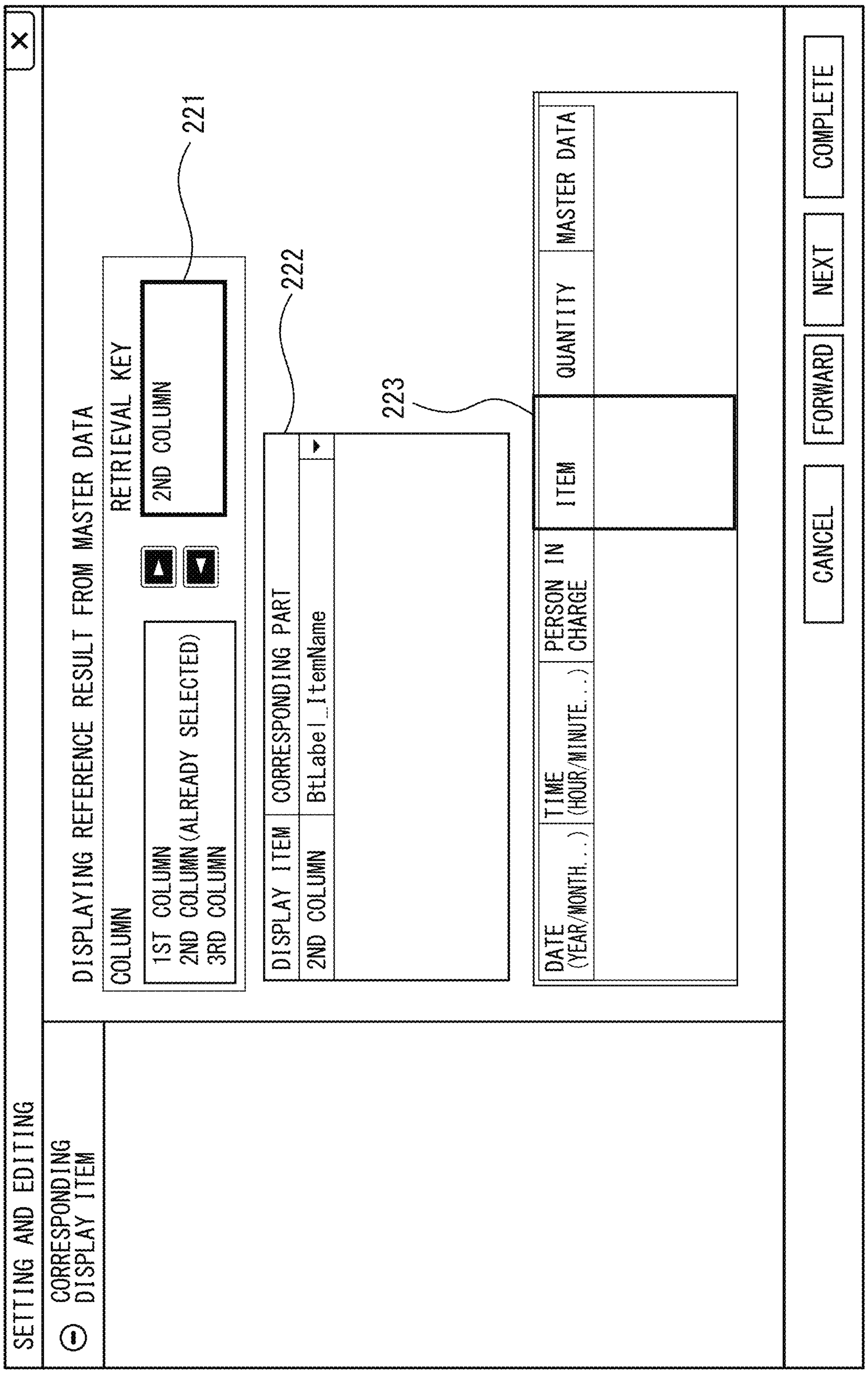
FIG. 22 is a diagram showing an example of an output element corresponding screen of the master data of the program development support device according to embodiment 1 of the present invention.

FIG. 22 is a diagram showing an example of an output element corresponding screen of the master data of the program development support device 4 according to embodiment 1 of the present invention. As shown in FIG. 22, the user selects which column to be the retrieval object among the specified or set master file in a retrieval object selection area 221. An output element corresponding to the retrieval object is set in an output element setting area 222. The user can visually confirm which item in the master file is selected as the retrieval object in a setting display area 223. Accordingly, the program (first program) in the information reading device 1 side and the program (second program) in the host computer 2 side can be generated based on the selected first field, the selected second field, and the corresponding respective output elements.

According to present embodiment 1 as described above, the retrieval information which is inputted by the user corresponds to any output element stored in the information reading device 1. While reviewing the preview screen of the master data and the output elements, it is possible to easily set which output element stored in the information reading device 1 is corresponded to the retrieval result data which is the result of the master data retrieved by inputting the retrieval information. Therefore, it is possible to easily create the program of the information reading device 1 side and the program of the host computer 2 side.

Embodiment 2

The structure of the program development support device 4 according to embodiment 2 of the present invention is similar to embodiment 1, and therefore, the same reference numerals are used and the detailed descriptions will be omitted. In embodiment 2, the point in which data is collated in the information reading device 1 differs from embodiment 1.

FIG. 23 is a diagram showing an example of a collation object setting screen of the program development support device 4 according to embodiment 2 of the present invention. In FIG. 23, a preview image on a display screen of the information reading device 1 is displayed in an image display area 231. In a collation setting area 232, the setting of an output element which receives a data input for comparison, and the setting of an output element which receives a data input for collation are received.

In addition, the specification of the collating method (1:1, 1:N (N is natural number), N:N, etc.) may be received. A setting whether or not the collation including input order is performed, a setting whether or not the data, in which the comparison is completed, is excluded, etc. may be received. N indicates the number of times of data inputs as a comparison object and the number of times of data inputs as an input data. At the same time, the setting of a set collation, in which a plurality of inputs such as a three-piece set, etc. is collated at the same time, is received.

In the example shown in FIG. 23, it is described in a case in which the data inputted from the output element of the information reading device 1 as a comparison object is used, but it does not necessarily use the input data. The data which is preliminary stored in the information reading device 1 or the host computer 2 as pre-stored data may be used for the collation.

Further, a setting of a collation condition (comparison condition) between the collation data and the data to be a comparison object is received in a condition setting area 233. In the condition setting area 233, regarding the data to be a comparison object and the collation data, a setting whether or not a range is specified, and a setting of the number of characters to be collated are received.

Figure 24:
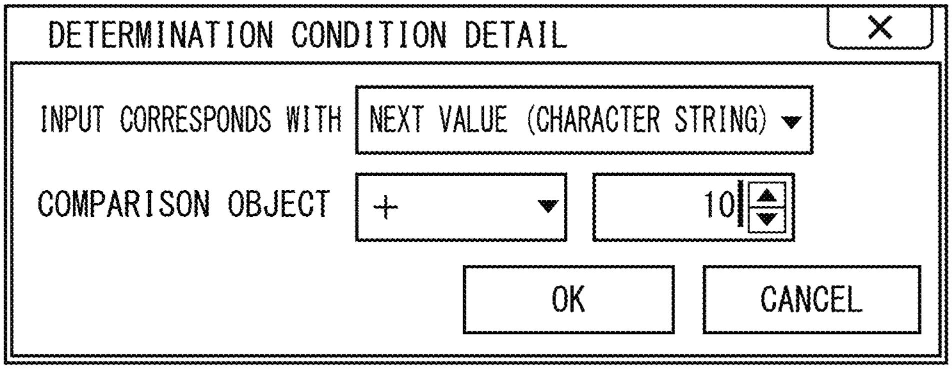
FIG. 24 is a diagram showing an example of a setting screen of a collation condition (comparison condition) of the program development support device according to embodiment 2 of the present invention.

When performing a detail setting, a separate setting screen may be shown as a pop-up display. FIG. 24 is a diagram showing an example of a setting screen of a collation condition (comparison condition) of the program development support device 4 according to embodiment 2 of the present invention.

In FIG. 24, as a collation condition (comparison condition) between the data to be a comparison object of the information reading device 1 and the collation data, not only “exact matching”, but also “prefix matching”, “suffix matching”, and “prefix matching and suffix matching” can be selected. Further, the number of digits of the data to be a comparison object can be arbitrarily set.

In response to the set collation condition, for each of the data to be a comparison object and the collation data, by performing a character string processing such as character string segmentation, unnecessary data deletion, etc., the display format of the retrieval information and the retrieval result data can be specified. Before executing the processing to generate the program of the information reading device 1 side and the program of the host computer 2 side as described in embodiment 1, by executing the character string processing according to embodiment 2, it is possible to generate the program of the information reading device 1 side and the program of the host computer 2 side so as to obtain the retrieval results by the desired retrieval information. Further, other than the data processing at the time of collation, a setting for a screen, which is displayed in accordance with the collation results, or a notification processing to the user (LED display, buzzer sound, etc.) may be received.

Embodiment 3

The structure of the program development support device 4 according to embodiment 3 of the present invention is similar to embodiments 1 and 2, and therefore, the same symbols are used and the detailed descriptions will be omitted. In embodiment 3, the point in which log data of the data collected in the information reading device 1 is stored differs from embodiments 1 and 2.

Figure 25:
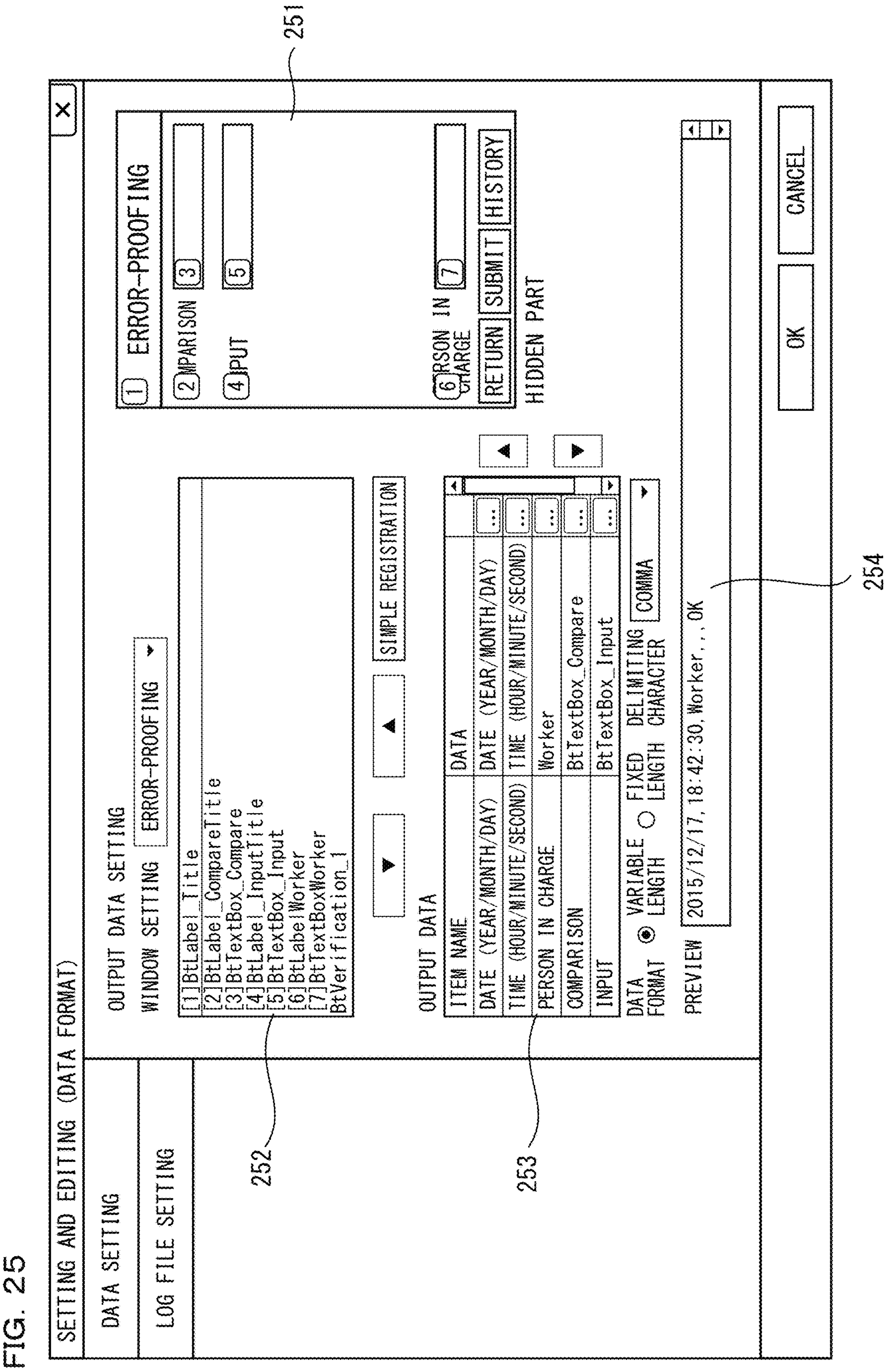
FIG. 25 is a diagram showing an example of an output setting screen of log data of an information reading device of the program development support device according to embodiment 3 of the present invention.

FIG. 25 is a diagram showing an example of an output setting screen of log data of the information reading device 1 of the program development support device 4 according to embodiment 3 of the present invention. In FIG. 25, a preview image of the display screen of the information reading device 1 is displayed in an image display area 251.

In a data display area 252, the data collected by reading in the information reading device 1 is displayed as a list including data which is not displayed. In an output data display area 253, among the data displayed in the data display area 252, the data which is selected as the data to be transmitted to the host computer 2 is displayed.

Basically, the selected data is registered in a selection order as the log data. However, it is possible to change the order of the registered log data by an up and down direction arrow buttons in the output data display area 253. The registered log data can be displayed in a preview area 254, and it is possible to confirm the contents of the registration, visually. After that, by the processing similar to embodiment 1, the program (first program) for the information reading device 1 is generated.

Further, the program (second program) for the host computer 2 can be generated in the similar manner. FIG. 26 is a diagram showing an example of the output setting screen of log data of the host computer 2 of the program development support device 4 according to embodiment 3 of the present invention.

In the example shown in FIG. 26, the selections of a menu list (inventory, carry-in and carry-out, communication route, etc.) displayed in the menu bar, a display position of a database displayed in each menu, displayed data classes (inventory list, inventory result, order list, etc.) are received. Further, the selections are received by the buttons arranged in an upper part or a lower part of the list display, drag-and-drop operation of GUI components such as dropdown list, etc. Regarding the method for setting each GUI component, the setting is received in a similar manner as the first program.

Concretely, in FIG. 26, for example, in a CSV file specifying area 261 of the information reading device 1, the specification of the CSV file employed as master data is received. The preview of the specified CSV file is displayed in a review display area 263.

Further, the list of the set log data (terminal data) is displayed in a log data display area 262. In the log data display area 262, the correspondence between the log data (terminal data) and the master data (management table column) is set in "processing contents." With this, which item is retrieved as the retrieval information can be registered as log data. Before executing the processing to generate the program of the information reading device 1 side and the program of the host computer 2 side as described in embodiment 1, by executing the log data setting processing according to embodiment 3, it is possible to generate the program of the information reading device 1 side and the program of the host computer 2 side so as to obtain the retrieval result by the desired retrieval information.

Further, according to the present embodiments, the input of the retrieval information is displayed in the information reading device 1. It is corresponded with any output element, and by the retrieval information which is inputted by the output element, the retrieval result data corresponding to the condition which is retrieved in the master data is displayed in the information reading device 1. The user can easily set a correspondence of the output element while reviewing the preview of the master data or the output element, so that it is possible to easily generate the programs of the information reading device 1 side and the host computer 2 side.

The present invention is not limited to the aforementioned embodiments, and various changes, modifications, etc. are possible within the range not departing from the gist of the present invention. For example, the host computer 2 may be in plural numbers, and one information reading device 1 may be connected to the plurality of host computers 2 which is capable of performing a data communication.

What is claimed is:

1. A program development support method for an information system including an information reading device and a host computer, and the method generating a first program for the information reading device and a second program for the host computer, the information reading device having a code reading unit, which executes a reading of an information code, and a display unit which displays various data; and the host computer being connected to be capable of performing a data communication with the information reading device and storing master data which includes data streams stored in a data matrix having a plurality of fields and a plurality of records, wherein the first program sends reading data, which is acquired based on the information code read by the information reading device, to the host computer, and the second program, which performs a retrieval in the master data based on the received reading data as retrieval information in the host computer and sends retrieval result data to be displayed on the display unit of the information reading device, based on the retrieval by the retrieval information to the information reading device, the program development support method comprising:

storing a setting used for a data communication between the information reading device and the host computer;

receiving a specification of the master data;

receiving a selection of (i) a first field, which is a retrieval processing object, from the plurality of fields in the master data which is specified, and (ii) a second field, in which the retrieval result data to be displayed on the display unit of the information reading device based on the retrieval by the retrieval information is stored, from the fields of the master data based on the retrieval information matching the information in the fields of the master data by a comparison condition;

corresponding (i) the first field in the master data with an output element used for inputting or displaying the reading data in the information reading device, and (ii) the second field in the master data with an output element used for displaying the retrieval result data in the information reading device; and generating the pair of the first program and the second program based on the first field and the second field which are selected, and the output elements which are respectively corresponded with the first field and the second field, so as to communicate with each other, the first program in the information reading device configured to (i) send reading data to the second program in the host computer for performing the retrieval, (ii) receive the retrieval result data in the second field of the master data, and (iii) output the retrieval result data on the information reading device, the second program in the host computer configured to (i) perform the retrieval based on the reading data in the first field of the master data; (ii) obtain the retrieval result data in the second field of the master data; and (iii) send the retrieval result data to the first program in the information reading device.

2. The program development support method according to claim 1, wherein the generating the pair of the first program and the second program generates the second program based on the first field and the second field which are selected.

3. The program development support method according to claim 1, further comprising: receiving a selection of a third field, which inputs or displays reading data based on the information code read by the information reading device, from the plurality of fields, and the third field and the first field or the second field being collated.

4. The program development support method according to claim 1, wherein a display mode in a display of a field which performs a selection is different from other fields.

5. The program development support method according to claim 1, wherein the data in the first field and the second field are displayed in the information reading device, and a correspondence relationship between the first field displayed in the information reading device and the second field of the master data in the host computer is displayed.

6. The program development support method according to claim 1, wherein the data in the first field and the second field are displayed in the information reading device and the second field, and template data in which a correspondence relationship between the first field displayed in the information reading device and the second field of the master data in the host computer is preliminary set is stored, and the first program and the second program are generated by reading the template data.

7. The program development support method according to claim 1, wherein the data in the first field and the second field are displayed in the information reading device, and a correspondence relationship between the first field displayed in the information reading device and the second field of the master data in the host computer is displayed, during at least one of the receiving the selection of the first field and the second field and the corresponding the first field and the second field.

8. A program development support device for an information system including an information reading device and a host computer, and the program development support device comprising a CPU and generating a pair of a first program for the information reading device and a second program for the host computer, the information reading device having a code reading unit, which executes a reading of an information code, and a display unit which displays various data; and the host computer being connected to be capable of performing a data communication with the information reading device and storing master data which includes data streams stored in a data matrix having a plurality of fields and a plurality of records, wherein the first program sends reading data, which is acquired based on the information code read by the information reading device, to the host computer, and the second program, which performs a retrieval in the master data based on the received reading data as retrieval information in the host computer and sends retrieval result data to be displayed on the display unit of the information reading device, based on the retrieval information to the information reading device, the program development support device comprising:

a communication setting storage unit which stores a setting used for the data communication between the information reading device and the host computer;

a master data specifying unit which receives a specification of the master data;

a first setting reception unit which receives a selection of (i) a first field, which is a retrieval processing object, from the plurality of fields in the master data which is specified, and (ii) a second field, in which the retrieval result data to be displayed on the display unit of the information reading device, based on the retrieval by the retrieval information, is stored, from the fields of the master data based on the retrieval information matching the information in the fields of the master data by a comparison condition;

a second setting reception unit (i) which corresponds the first field in the master data with an output element used for inputting or displaying the reading data in the information reading device, and (ii) which corresponds the second field in the master data with an output element used for displaying the retrieval result data in the information reading device; and a processor which generates the pair of the first program and the second program based on the first field and the second field which are selected, and the output elements which are respectively corresponded with the first field and the second field, so as to communicate with each other, the first program in the information reading device configured to (i) send reading data to the second program in the host computer for performing the retrieval, (ii) receive the retrieval result data in the second field of the master data, and (iii) output the retrieval result data on the information reading device, the second program in the host computer configured to (i) perform the retrieval based on the reading data in the first field of the master data; (ii) obtain the retrieval result data in the second field of the master data; and (iii) send the retrieval result data to the first program in the information reading device.

9. The program development support device according to claim 8, wherein the processor generates the second program based on the first field and the second field which are selected in the first setting reception unit.

10. The program development support device according to claim 8, further comprising: a third setting reception unit which receives a selection of a third field, which inputs or displays reading data based on the information code read by the information reading device, and wherein the third field and the first field or the second field are collated.

11. The program development support device according to claim 8, wherein a display mode in a display of a field which performs a selection is different from other fields.

12. The program development support device according to claim 8, wherein the data in the first field and the second field are displayed in the information reading device, and a correspondence relationship between the first field displayed in the information reading device and the second field of the master data in the host computer is displayed.

13. The program development support device according to claim 8, wherein the data in the first field and the second field are displayed in the information reading device, and template data in which a correspondence relationship between the first field displayed in the information reading device and the second field of the master data in the host computer is preliminary set is stored, and the first program and the second program are generated by reading the template data.

14. The program development support device according to claim 8, wherein the data in the first field and the second field are displayed in the information reading device, and a correspondence relationship between the first field displayed in the information reading device and the second field of the master data in the host computer is displayed, when at least one of the first setting reception unit receives a selection of a first field and the second setting reception unit corresponds the first field and corresponds the second field.

15. A non-transitory computer readable medium including a computer program executable in a program development support device for an information system including an information reading device and a host computer, and the program development support device comprising a CPU and generating a pair of a first program for the information reading device and a second program for the host computer, the information reading device having a code reading unit, which executes a reading of an information code, and a display unit which displays various data; and the host computer being connected to be capable of performing a data communication with the information reading device and storing master data which includes data streams stored in a data matrix having a plurality of fields and a plurality of records, wherein the first program sends reading data, which is acquired based on the information code read by the information reading device, to the host computer, and the second program, which performs a retrieval in the master data based on the received reading data as retrieval information in the host computer and sends retrieval result data to be displayed on the display unit of the information reading device, based on the retrieval by the retrieval information to the information reading device, the computer program causing the program development support device to execute the steps of:

a first step storing a setting used for a data communication between the information reading device and the host computer;

a second step receiving a specification of the master data;

a third step receiving a selection of (i) a first field, which is a retrieval processing object, from the plurality of fields in the master data which is specified, and (ii) a second field, in which the retrieval result data to be displayed on the display unit of the information reading device based on the retrieval by the retrieval information is stored, from the fields of the master data based on the retrieval information matching the information in the fields of the master data by a comparison condition;

a fourth step corresponding (i) the first field in the master data with an output element used for inputting or displaying the reading data in the information reading device, and (ii) the second field in the master data with an output element used for displaying the retrieval result data in the information reading device; and a fifth step generating the pair of the first program and the second program based on the first field and the second field which are selected, and the output elements which are respectively corresponded with the first field and the second field, so as to communicate with each other, the first program in the information reading device configured to (i) send reading data to the second program in the host computer for performing the retrieval, (ii) receive the retrieval result data in the second field of the master data, and (iii) output the retrieval result data on the information reading device, the second program in the host computer configured to (i) perform the retrieval based on the reading data in the first field of the master data; (ii) obtain the retrieval result data in the second field of the master data; and (iii) send the retrieval result data to the first program in the information reading device.

16. The non-transitory computer readable medium according to claim 15, wherein the fifth step generates the second program based on the first field and the second field which are selected.

17. The non-transitory computer readable medium according to claim 15, further comprising: a sixth step receiving a selection of a third field, which inputs or displays reading data based on the information code read by the information reading device, from the plurality of fields, and the third field and the first field or the second field being collated.

18. The non-transitory computer readable medium according to claim 15, wherein a display mode in a display of a field which performs a selection is different from other fields.

19. The non-transitory computer readable medium according to claim 15, wherein the data in the first field and the second field are displayed in the information reading device, and a correspondence relationship between the first field displayed in the information reading device and the second field of the master data in the host computer is displayed.

20. The non-transitory computer readable medium according to claim 15, wherein the data in the first field and the second field are displayed in the information reading device, and a correspondence relationship between the first field displayed in the information reading device and the second field of the master data in the host computer is displayed, during at least one of the third step and fourth step.

* * * * *